US012466075B2

(12) United States Patent
Stathis et al.

(10) Patent No.: US 12,466,075 B2
(45) Date of Patent: Nov. 11, 2025

(54) AUTONOMOUS AND TELEOPERATED SENSOR POINTING ON A MOBILE ROBOT

(71) Applicant: Boston Dynamics, Inc., Waltham, MA (US)

(72) Inventors: Christopher Stathis, Bedford, MA (US); Dion Gonano, Somerville, MA (US); Robert Eugene Paolini, Cambridge, MA (US); Adam Komoroski, Westwood, MA (US)

(73) Assignee: Boston Dynamics, Inc., Waltham, MA (US)

( * ) Notice: Subject to any disclaimer, the term of this patent is extended or adjusted under 35 U.S.C. 154(b) by 181 days.

(21) Appl. No.: 17/805,101

(22) Filed: Jun. 2, 2022

(65) Prior Publication Data

US 2022/0388174 A1 Dec. 8, 2022

Related U.S. Application Data

(60) Provisional application No. 63/202,291, filed on Jun. 4, 2021.

(51) Int. Cl.
*B25J 9/16* (2006.01)
(52) U.S. Cl.
CPC ............ *B25J 9/1697* (2013.01); *B25J 9/163* (2013.01); *B25J 9/1653* (2013.01); *B25J 9/1664* (2013.01)
(58) Field of Classification Search
CPC ........ B25J 9/1697; B25J 9/163; B25J 9/1653; B25J 9/1664; G05B 2219/40003; G05B 2219/40298; G05B 2219/40543
See application file for complete search history.

(56) References Cited

U.S. PATENT DOCUMENTS 6,904,334 B2 * 6/2005 Asano ................... G06N 3/008
340/552
8,060,344 B2 11/2011 Stathis
(Continued)

FOREIGN PATENT DOCUMENTS

WO  WO 2008/060689     5/2008
WO  WO 2021/211251    10/2021
(Continued)

OTHER PUBLICATIONS

Gulalkari et al., Object Following Control of Six-legged Robot Using Kinect Camera, IEEE, 2014, pp. 758-764 (Year: 2014).*
(Continued)

*Primary Examiner* — Sze-Hon Kong
(74) *Attorney, Agent, or Firm* — Knobbe, Martens, Olson & Bear, LLP

(57) ABSTRACT

A computer-implemented method executed by data processing hardware of a robot causes the data processing hardware to perform operations. The operations include receiving a sensor pointing command that commands the robot to use a sensor to capture sensor data of a location in an environment of the robot. The sensor is disposed on the robot. The operations include determining, based on an orientation of the sensor relative to the location, a direction for pointing the sensor toward the location, and an alignment pose of the robot to cause the sensor to point in the direction toward the location. The operations include commanding the robot to move from a current pose to the alignment pose. After the robot moves to the alignment pose and the sensor is pointing in the direction toward the location, the operations include commanding the sensor to capture the sensor data of the location in the environment.

27 Claims, 10 Drawing Sheets

(56) References Cited

U.S. PATENT DOCUMENTS

| | | | |
|---|---|---|---|
| 8,410,732 B2 | 4/2013 | Kassow et al. | |
| 8,594,844 B1* | 11/2013 | Gal | F41H 7/005 |
| | | | 700/258 |
| 8,614,559 B2 | 12/2013 | Kassow et al. | |
| 8,725,273 B2* | 5/2014 | Lenser | G06T 15/00 |
| | | | 700/250 |
| 8,779,715 B2 | 7/2014 | Kassow et al. | |
| 8,874,261 B2 | 10/2014 | Hein et al. | |
| 8,929,603 B1* | 1/2015 | Maali | G06T 7/194 |
| | | | 382/103 |
| 9,592,912 B1 | 3/2017 | Michini et al. | |
| 9,747,698 B2 | 8/2017 | Stathis | |
| 9,770,823 B2* | 9/2017 | Huang | B25J 11/002 |
| 9,858,712 B2 | 1/2018 | Stathis | |
| 9,876,993 B2* | 1/2018 | Sablak | H04N 7/183 |
| 10,155,166 B1* | 12/2018 | Taylor | A63F 13/25 |
| 10,410,328 B1* | 9/2019 | Liu | G05D 1/0274 |
| 11,331,799 B1* | 5/2022 | Shafer | B25J 9/1664 |
| 11,372,408 B1* | 6/2022 | Webster | G05D 1/0212 |
| 11,416,003 B2 | 8/2022 | Whitman et al. | |
| 11,537,130 B2 | 12/2022 | Gaschler | |
| 11,712,802 B2 | 8/2023 | Chestnutt et al. | |
| 11,787,050 B1* | 10/2023 | Kaehler | B25J 19/021 |
| | | | 700/253 |
| 11,797,016 B2 | 10/2023 | Seifert et al. | |
| 12,304,083 B2* | 5/2025 | Zheng | B62D 57/032 |
| 2002/0169733 A1 | 11/2002 | Peters, II et al. | |
| 2002/0183896 A1* | 12/2002 | Ogure | A63H 11/00 |
| | | | 700/245 |
| 2004/0193321 A1 | 9/2004 | Anfindsen et al. | |
| 2004/0199302 A1* | 10/2004 | Pillar | B65F 3/045 |
| | | | 701/1 |
| 2005/0041839 A1* | 2/2005 | Saitou | H04N 1/00137 |
| | | | 382/103 |
| 2005/0126144 A1 | 6/2005 | Koselka et al. | |
| 2005/0222713 A1* | 10/2005 | Kawabe | B25J 19/021 |
| | | | 700/259 |
| 2009/0052740 A1* | 2/2009 | Sonoura | G06V 10/24 |
| | | | 901/1 |
| 2010/0036527 A1* | 2/2010 | Matsunaga | B25J 9/1676 |
| | | | 901/1 |
| 2011/0231016 A1* | 9/2011 | Goulding | G05D 1/0088 |
| | | | 901/1 |
| 2011/0264265 A1* | 10/2011 | Kanemoto | B25J 9/1666 |
| | | | 901/29 |
| 2012/0121161 A1* | 5/2012 | Eade | G06F 16/444 |
| | | | 901/1 |
| 2012/0155775 A1* | 6/2012 | Ahn | G05D 1/0272 |
| | | | 701/527 |
| 2012/0158183 A1* | 6/2012 | Lim | B25J 9/162 |
| | | | 700/261 |
| 2012/0197464 A1 | 8/2012 | Wang et al. | |
| 2012/0280087 A1 | 11/2012 | Coffman et al. | |
| 2013/0231779 A1* | 9/2013 | Purkayastha | B25J 9/1697 |
| | | | 700/258 |
| 2013/0338525 A1* | 12/2013 | Allen | A61B 5/742 |
| | | | 600/534 |
| 2014/0129027 A1 | 5/2014 | Schnittman | |
| 2014/0336848 A1* | 11/2014 | Saund | G06V 20/13 |
| | | | 701/3 |
| 2015/0269439 A1* | 9/2015 | Versace | G06V 10/255 |
| | | | 382/103 |
| 2015/0273684 A1 | 10/2015 | Huang et al. | |
| 2015/0296142 A1* | 10/2015 | Cappel-Porter | H04N 23/698 |
| | | | 348/37 |
| 2016/0188977 A1* | 6/2016 | Kearns | H04N 7/185 |
| | | | 348/113 |
| 2017/0329347 A1 | 11/2017 | Passot et al. | |
| 2017/0358201 A1* | 12/2017 | Govers | G08B 31/00 |
| 2018/0141562 A1 | 5/2018 | Singhal | |
| 2018/0181137 A1* | 6/2018 | Choi | G06V 20/10 |
| 2018/0236654 A1* | 8/2018 | Mozeika | B25J 9/02 |
| 2018/0364045 A1 | 12/2018 | Williams et al. | |
| 2019/0086894 A1 | 3/2019 | Tenorth | |
| 2019/0184572 A1* | 6/2019 | Hayashi | B25J 5/007 |
| 2019/0185186 A1 | 6/2019 | Li | |
| 2019/0307106 A1* | 10/2019 | Hartung | A01K 29/00 |
| 2020/0012239 A1 | 1/2020 | Yamamoto | |
| 2020/0070343 A1 | 3/2020 | Thomaz et al. | |
| 2020/0174484 A1* | 6/2020 | Eoh | G05D 1/0248 |
| 2020/0206918 A1* | 7/2020 | Sun | G06N 99/00 |
| 2021/0041243 A1 | 2/2021 | Fay et al. | |
| 2021/0041878 A1 | 2/2021 | Seifert et al. | |
| 2021/0181750 A1 | 6/2021 | Gogna et al. | |
| 2021/0318687 A1 | 10/2021 | Seifert et al. | |
| 2021/0346557 A1* | 11/2021 | Brooks | A47L 11/4011 |
| 2022/0083061 A1* | 3/2022 | Xie | G01S 17/89 |
| 2022/0083076 A1* | 3/2022 | Maeda | G01C 21/20 |
| 2022/0113745 A1* | 4/2022 | Panigrahi | G05D 1/0212 |
| 2022/0138612 A1 | 5/2022 | Vengertsev et al. | |
| 2022/0139027 A1* | 5/2022 | Luo | G06T 15/205 |
| | | | 345/418 |
| 2022/0187828 A1* | 6/2022 | Miyagawa | H04N 5/222 |
| 2022/0194245 A1 | 6/2022 | Gonana et al. | |
| 2022/0237910 A1* | 7/2022 | Hirai | G08B 13/19647 |
| 2022/0258356 A1* | 8/2022 | Chi | B25J 9/1697 |
| 2022/0305657 A1* | 9/2022 | Hong | G05D 1/0223 |
| 2022/0388170 A1 | 12/2022 | Merewether | |
| 2022/0388174 A1 | 12/2022 | Stathis et al. | |
| 2022/0390950 A1 | 12/2022 | Yamauchi | |
| 2023/0015335 A1 | 1/2023 | Gao et al. | |
| 2023/0016514 A1* | 1/2023 | Zheng | G05D 1/0251 |
| 2023/0055206 A1* | 2/2023 | Zheng | G05D 1/0231 |
| 2023/0087057 A1* | 3/2023 | Wang | B25J 13/088 |
| | | | 700/245 |
| 2023/0107289 A1* | 4/2023 | Maeda | G01C 21/20 |
| | | | 701/23 |
| 2023/0125422 A1* | 4/2023 | Tsuzaki | B62D 57/032 |
| | | | 700/246 |
| 2023/0215024 A1* | 7/2023 | Huang | G06T 7/62 |
| | | | 382/103 |
| 2023/0297118 A1 | 9/2023 | Yanks et al. | |
| 2023/0400863 A1* | 12/2023 | Chen | G05D 1/686 |
| 2023/0418302 A1 | 12/2023 | Seifert et al. | |
| 2023/0418305 A1 | 12/2023 | Chestnutt et al. | |
| 2024/0061436 A1* | 2/2024 | Tsuzaki | B62D 57/02 |
| 2024/0087738 A1* | 3/2024 | Wang | G06F 3/04847 |
| 2024/0377843 A1 | 11/2024 | Ryde et al. | |

FOREIGN PATENT DOCUMENTS

| | | |
|---|---|---|
| WO | WO 2022/256818 | 12/2022 |
| WO | WO 2023/140928 | 7/2023 |

OTHER PUBLICATIONS

Lakrouf et al., Moving Obstacles Detection and Camera Pointing for Mobile Robot Applications, Feb. 8-12, 2017, ICMRE'17, Association for Computing Machinery, pp. 57-62 (Year: 2017).*

Scheper K.Y.W, "Behavior Trees for Evolutionary Robotics: Reducing the Reality Gap." Jun. 18, 2014, 197 pages.

International Search Report and Written Opinion received in Application No. PCT/US2021/022928, mailed Jun. 1, 2021, 10 pages.

International Search Report and Written Opinion received in Application No. PCT/US2022/051064, mailed Mar. 29, 2023, 10 pages.

Echegoyen et al., "Visual Servoing of Legged Robots", Journal of Mathematical Imaging and Vision, Kluwer Academic Publishers, vol. 42, No. 2-3, dated Apr. 29, 2011, pp. 196-211.

Girshick, R., "Fast R-CNN" Computer Vision and Pattern Recognition, arXiv:1504.08083 [cs.CV] version 2 dated Sep. 27, 2015 in 9 pages.

Hosoda et al., "Vision-Based Servoing Control for Legged Robots". Proceedings of the 1997 IEEE International Conference on Robotics and Automation Albuquerque, New Mexico, dated Apr. 1997, vol. 4, pp. 3154-3159.

Hutchinson, et al., "A Tutorial on Visual Servo Control" IEEE Transactions on Robotics and Automation, vol. 12, No. 5, Oct. 1996 in 20 pages.

(56) References Cited

OTHER PUBLICATIONS

International Search Report and Written Opinion for International Application No. PCT/US2022/072714 dated Sep. 19, 2022 in 18 pages.
Rublee et al., "ORB: an efficient alternative to SIFT or SURF" IEEE, 2011 International Conference on Computer Vision, 2011, pp. 2564-2571.
International Search Report and Written Opinion received in Application No. PCT/US2023/084269, mailed May 7, 2024, 15 pages.
European Communication Rule 114(2) EPC—Third Party Observations received in Application No. EP 22740724.4 filed Dec. 23, 2024, mailed Jan. 9, 2025, 6 pages.

* cited by examiner

AUTONOMOUS AND TELEOPERATED SENSOR POINTING ON A MOBILE ROBOT

CROSS REFERENCE TO RELATED APPLICATIONS

This application claims priority under 35 U.S.C. § 119(e) to U.S. Provisional Application 63/202,291, filed on Jun. 4, 2021. The disclosure of this prior application is considered part of the disclosure of this application and is hereby incorporated by reference in its entirety.

TECHNICAL FIELD

This disclosure relates to sensor pointing for mobile robots.

BACKGROUND

Robotic devices are used to autonomously or semi-autonomously perform tasks such as navigating to a specified location and capturing sensor data with one or more sensors. For example, the robot may be tasked to navigate to a point of interest and, using a camera, capture image data of the point of interest without user input or supervision. In these scenarios, the user expects the sensor data capture to be accurate and repeatable.

SUMMARY

An aspect of the present disclosure provides a computer-implemented method that when executed by data processing hardware of a robot causes the data processing hardware to perform operations. The operations include receiving a sensor pointing command that commands the robot to use a sensor to capture sensor data of a target location in an environment of the robot. The sensor is disposed on the robot. The operations include determining, based on an orientation of the sensor relative to the target location, a target direction for pointing the sensor toward the target location, and an alignment pose of the robot to cause the sensor to point in the target direction toward the target location. The operations further include commanding the robot to move from a current pose to the alignment pose. After the robot moves to the alignment pose and the sensor is pointing in the target direction toward the target location, the operations include commanding the sensor to capture the sensor data of the target location in the environment.

In some implementations, the operations further include, in response to receiving the sensor pointing command, commanding the robot to navigate to a target point of interest in the environment. In those implementations, determining the target direction and the alignment pose includes determining the target direction and the alignment pose after the robot navigates to the target point of interest.

In some embodiments, the sensor includes a camera.

In some examples, the sensor includes a pan-tilt-zoom (PTZ) sensor. In further examples, after determining the target direction for pointing the PTZ sensor toward the target location, the operations further include determining that a center of a field of sensing of the PTZ sensor is not aligned with the target direction. In those further examples, the operations also further include determining PTZ alignment parameters for aligning the center of the field of sensing of the PTZ sensor with the target direction. In those further examples, the operations also further include commanding, using the PTZ alignment parameters, the PTZ sensor to adjust the center of the field of sensing of the PTZ sensor to align with the target direction. In even further examples, after commanding the PTZ sensor to adjust the center of the field of sensing of the PTZ sensor, the operations further include receiving, from the PTZ sensor, alignment feedback data indicating an error between the adjusted center of the field of sensing of the PTZ sensor and the target direction. In those even further examples, determining the alignment pose of the robot is further based on the received alignment feedback data. In additionally further examples, the error indicates that a difference between the adjusted center of the field of sensing of the PTZ sensor and the target direction is greater than a threshold difference.

In some implementations, receiving the sensor pointing command includes receiving a user input indication indicating selection of a ray or a point relative to a known coordinate frame of the robot.

In some embodiments, the sensor pointing command includes a model of an object and, before commanding the sensor to capture the sensor data, the operations further include capturing image data using a camera in a requested direction. In those embodiments, the operations also include determining whether the object, using the model of the object, is present in the captured data and, when the object is present in the captured image data, determining the target direction to center the object within a field of sensing of the sensor.

In some examples, the sensor pointing command includes an object classification of an object from an output of an object detector and, before commanding the sensor to capture the sensor data, the operations further include capturing image data using a camera in a requested direction. In those examples, the operations also include determining whether the classified object, using the output of the object detector is present in the captured image data and, when the classified object is present in the captured image data, determining the target direction to center the classified object within a field of sensing of the sensor.

In some implementations, the sensor is fixed to the robot. In some embodiments, determining the alignment pose of the robot that causes the sensor to point in the target direction includes determining inverse kinematics of the robot. In some examples, determining the alignment pose of the robot that causes the sensor to point in the target direction includes processing image data captured by a second sensor that is different from the sensor.

Another aspect of the present disclosure provides a system. The system includes data processing hardware and memory hardware in communication with the data processing hardware. The memory hardware stores instructions that when executed on the data processing hardware cause the data processing hardware to perform operations. The operations include receiving a sensor pointing command that commands a robot to use a sensor to capture sensor data of a target location in an environment of the robot. The sensor is disposed on the robot. The operations include determining, based on an orientation of the sensor relative to the target location, a target direction for pointing the sensor toward the target location, and an alignment pose of the robot to cause the sensor to point in the target direction toward the target location. The operations further include commanding the robot to move from a current pose to the alignment pose, and commanding the sensor to capture the sensor data of the target location in the environment.

In some implementations, the operations further include, in response to receiving the sensor pointing command, commanding the robot to navigate to a target point of interest in the environment. In those implementations, determining the target direction and the alignment pose includes determining the target direction and the alignment pose after the robot navigates to the target point of interest.

In some embodiments, the sensor includes a camera.

In some examples, the sensor includes a pan-tilt-zoom (PTZ) sensor. In further examples, after determining the target direction for pointing the sensor toward the target location, the operations further include determining that a center of a field of sensing of the PTZ sensor is not aligned with the target direction. In those further examples, the operations also further include determining PTZ alignment parameters for aligning the center of the field of sensing of the PTZ sensor with the target direction. In those further examples, the operations also further include commanding, using the PTZ alignment parameters, the PTZ sensor to adjust the center of the field of sensing of the PTZ sensor to align with the target direction. In even further examples, after commanding the PTZ sensor to adjust the center of the field of sensing of the PTZ sensor, the operations further include receiving, from the PTZ sensor, alignment feedback data indicating an error between the adjusted center of the field of sensing of the PTZ sensor and the target direction. In those even further examples, determining the alignment pose of the robot is further based on the received alignment feedback data. In additionally further examples, the error indicates that a difference between the adjusted center of the field of sensing of the PTZ sensor and the target direction is greater than a threshold difference.

In some implementations, receiving the sensor pointing command includes receiving a user input indication indicating selection of a ray or a point relative to a known coordinate frame of the robot.

In some embodiments, the sensor pointing command includes a model of an object and, before commanding the sensor to capture the sensor data, the operations further include capturing image data using a camera in a requested direction. In those embodiments, the operations also include determining whether the object, using the model of the object, is present in the captured data and, when the object is present in the captured image data, determining the target direction to center the object within a field of sensing of the sensor.

In some examples, the sensor pointing command includes an object classification of an object from an output of an object detector and, before commanding the sensor to capture the sensor data, the operations further include capturing image data using a camera in a requested direction. In those examples, the operations also include determining whether the classified object, using the output of the object detector is present in the captured image data and, when the classified object is present in the captured image data, determining the target direction to center the classified object within a field of sensing of the sensor.

In some implementations, the sensor is fixed to the robot. In some embodiments, determining the alignment pose of the robot that causes the sensor to point in the target direction includes determining inverse kinematics of the robot. In some examples, determining the alignment pose of the robot that causes the sensor to point in the target direction includes processing image data captured by a second sensor that is different from the sensor.

Yet another aspect of the present disclosure provides a computer-implemented method that when executed by data processing hardware of a robot causes the data processing hardware to perform operations. The operations include receiving a sensor pointing command that commands the robot to use a sensor to capture sensor data of a target location in an environment of the robot. The sensor is disposed on the robot. The operations include determining, based on an orientation of the sensor relative to the target location, a target direction for pointing the sensor toward the target location. The operations include with the sensor pointing in the target direction toward the target location, commanding the sensor to capture the sensor data of the target location in the environment.

In some implementations, the operations further include determining, based on the orientation of the sensor relative to the target location, an alignment pose of the robot to cause the sensor to point in the target direction toward the target location, and commanding the robot to move from a current pose to the alignment pose. In further implementations, commanding the sensor to capture the sensor data occurs after the robot moves to the alignment pose and the sensor is pointing in the target direction toward the target location.

An additional aspect of the present disclosure provides a system. The system includes data processing hardware and memory hardware in communication with the data processing hardware. The memory hardware stores instructions that when executed on the data processing hardware cause the data processing hardware to perform operations. The operations include receiving a sensor pointing command that commands a robot to use a sensor to capture sensor data of a target location in an environment of the robot. The sensor is disposed on the robot. The operations include determining, based on an orientation of the sensor relative to the target location, a target direction for pointing the sensor toward the target location. The operations include with the sensor pointing in the target direction toward the target location, commanding the sensor to capture the sensor data of the target location in the environment.

In some implementations, the operations further include determining, based on the orientation of the sensor relative to the target location, an alignment pose of the robot to cause the sensor to point in the target direction toward the target location, and commanding the robot to move from a current pose to the alignment pose. In further implementations, commanding the sensor to capture the sensor data occurs after the robot moves to the alignment pose and the sensor is pointing in the target direction toward the target location.

In another aspect, a method of autonomous and teleoperated sensor pointing is provided. The method includes detecting an orientation of a sensor of a robot relative to a target location using a computing system of the robot, determining, based on the detected orientation of the sensor, a target direction for pointing the sensor and an alignment pose of the robot using the computing system, controlling one or more joints of the robot to move the robot from a current pose to the alignment pose and to point the sensor in the target direction, and once the robot has moved to the alignment pose and the sensor is pointing in the target direction, capturing sensor data using the sensor.

In another aspect, a robot is provided. The robot includes a sensor, a computing system configured to detect an orientation of the sensor relative to a target location, and to determine a target direction for pointing the sensor and an alignment pose of the robot based on the detected orientation, a plurality of joints, wherein the computing system is further configured to control one or more of the plurality of joints to move the robot from a current pose to the alignment pose and to point the sensor in the target direction, wherein the sensor is configured to capture sensor data with the robot positioned in the alignment pose and the sensor pointing in the target direction.

The details of the one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Modern autonomous and semi-autonomous robots are equipped with complex mapping, localization, and navigation systems. Additionally, these robots are often equipped with one or more sensors for capturing data related to the environment in which the robot is travelling. Autonomous and semi-autonomous robots can be used in autonomous inspection applications, where the robot is instructed to travel to a point of interest (POI) or is brought to the POI by a user and is instructed to capture data using one or more of its sensors in a manner specified by a command provided to the robot.

Embodiments herein are directed toward systems and methods for implementing a command to capture sensor data of a target environment of a robot with accuracy and/or ability to conform the capture technique relative to the target environment. The robot utilizes a navigation system to determine a travel path to the target environment and uses a sensor pointing system to determine an orientation of the sensor at the robot relative to the target environment. Based on instructions received by the robot, the sensor pointing system commands the robot to move in a way that aligns the sensor relative to the target environment in a desired way. For example, the movement can include changing from a current pose of the robot to an alignment pose that causes the sensor to point in a target direction.

By implementing the sensor pointing system in this manner, sensor data is accurately captured from the target environment and/or from a target object in a target orientation of the sensor relative to the target environment. Moreover the sensor data can be captured by the robot executing instructions without intervention and/or supervision by a user.

Figure 1A:
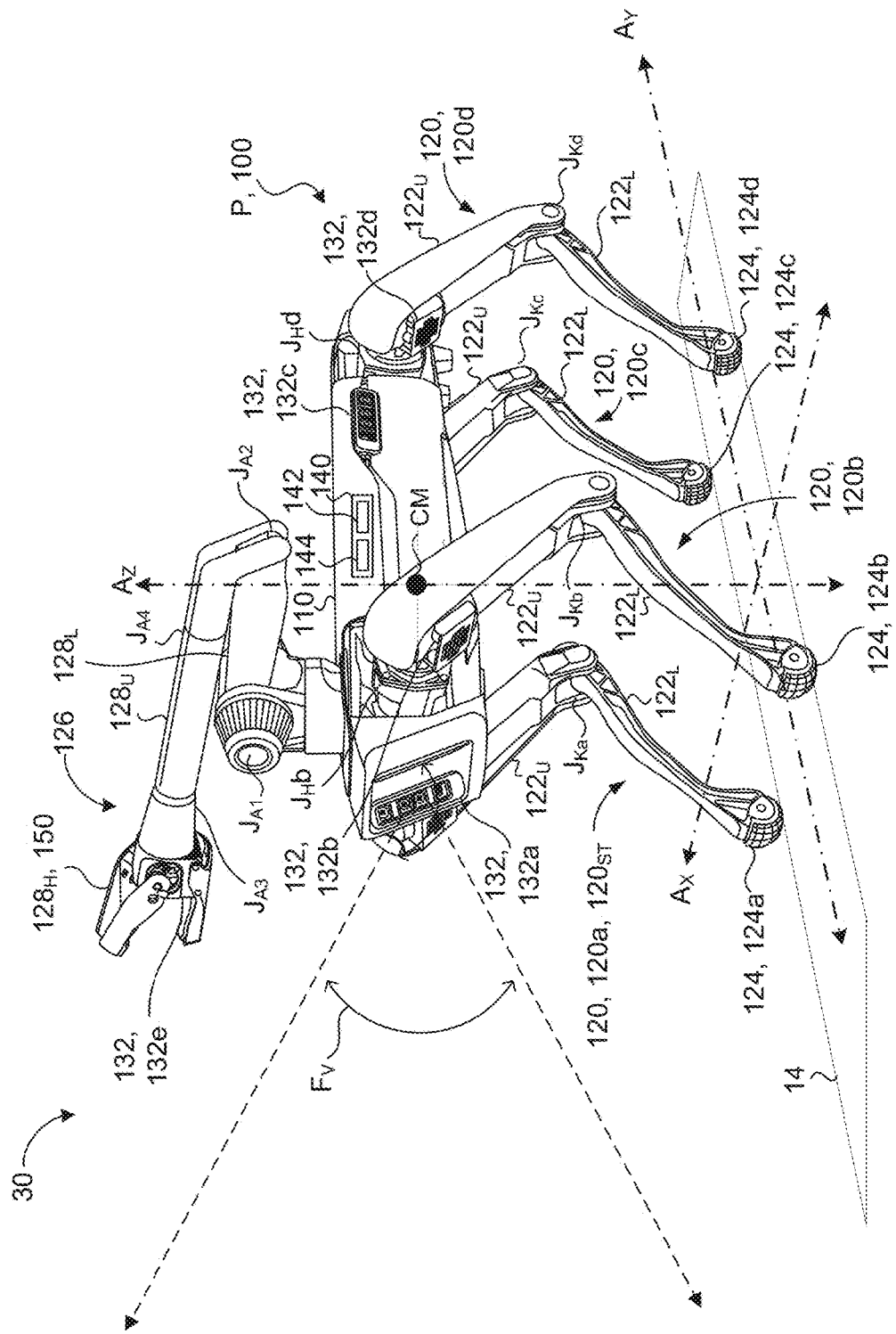
FIG. 1A is a schematic view of an example robot for navigating about an environment.
Figure 1B:
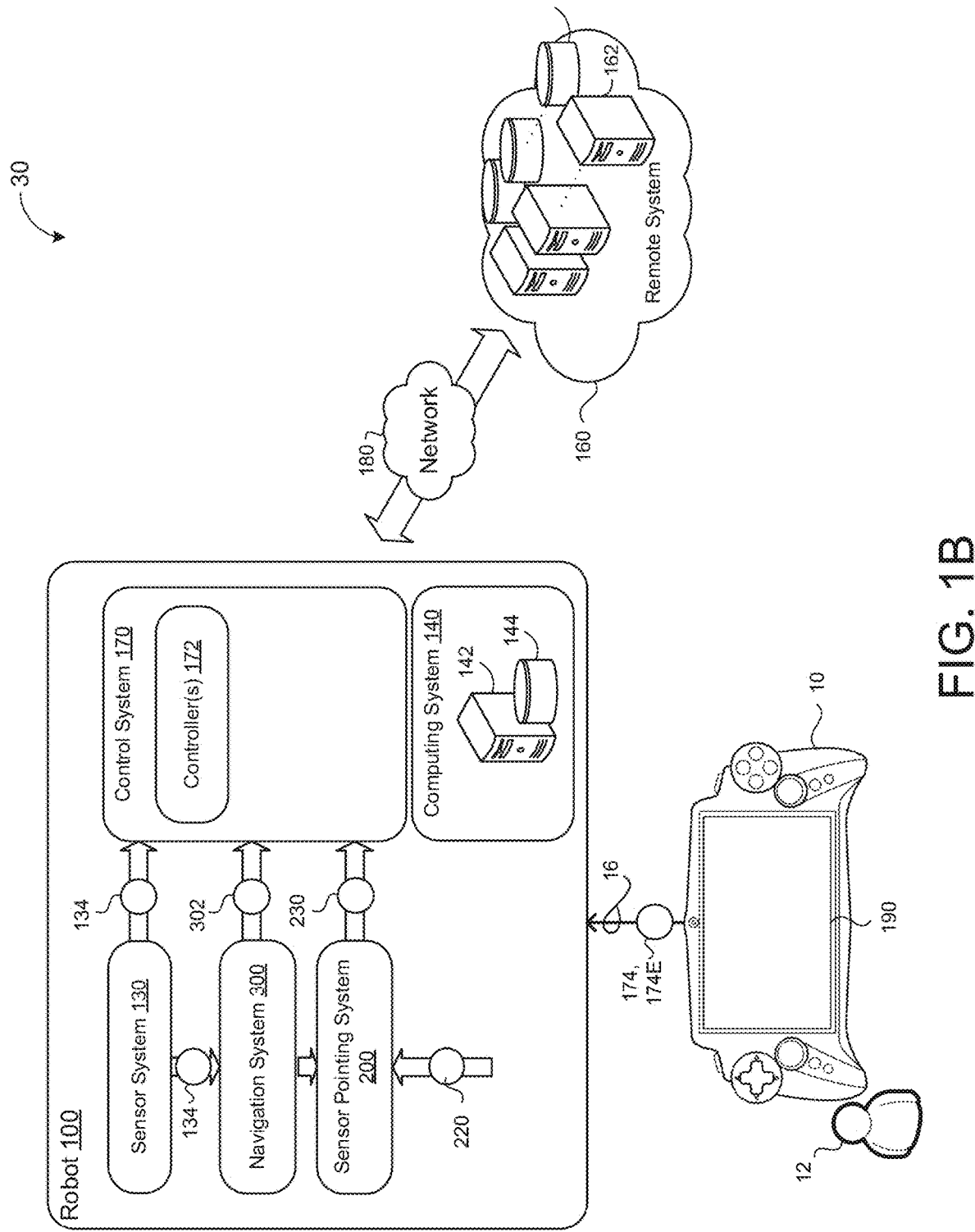
FIG. 1B is a schematic view of one embodiment of a sensor pointing system for pointing a sensor of the robot of FIG. 1A.

Referring to FIGS. 1A and 1B, in some implementations, a robot 100 includes a body 110 with one or more locomotion based structures such as legs 120a-d coupled to the body 110 and that enable the robot 100 to move within the environment 30. In some examples, each leg 120 is an articulable structure such that one or more joints J permit members 122 of the leg 120 to move. For instance, each leg 120 includes a hip joint JH (for example, $J_Hb$ and $J_Hd$ of FIG. 1A) coupling an upper member 122, $122_U$ of the leg 120 to the body 110 and a knee joint JK (for example, $J_{Ka}$, $J_{Kb}$, $J_{Kc}$, and $J_{Kd}$ of FIG. 1A) coupling the upper member $122_U$ of the leg 120 to a lower member $122_L$ of the leg 120. Although FIG. 1A depicts a quadruped robot with four legs 120a-d, the robot 100 may include any number of legs or locomotive based structures (e.g., a biped or humanoid robot with two legs, or other arrangements of one or more legs) that provide a means to traverse the terrain within the environment 30.

In order to traverse the terrain, each leg 120 has a distal end 124 (for example, distal ends 124a, 124b, 124c, and 124d of FIG. 1A) that contacts a surface of the terrain (i.e., a traction surface). In other words, the distal end 124 of each leg 120 is the end of the leg 120 used by the robot 100 to pivot, plant, or generally provide traction during movement of the robot 100. For example, the distal end 124 of a leg 120 corresponds to a foot of the robot 100. In some examples, though not shown, the distal end 124 of the leg 120 includes an ankle joint such that the distal end 124 is articulable with respect to the lower member $122_L$ of the leg 120.

In the examples shown, the robot 100 includes an arm 126 that functions as a robotic manipulator. The arm 126 may be configured to move about multiple degrees of freedom in order to engage elements of the environment 30 (e.g., objects within the environment 30). In some examples, the arm 126 includes one or more members 128, where the members 128 are coupled by joints J such that the arm 126 may pivot or rotate about the joint(s) J. For instance, with more than one member 128, the arm 126 may be configured to extend or to retract. To illustrate an example, FIG. 1A depicts the arm 126 with three members 128 corresponding to a lower member $128_L$, an upper member $128_U$, and a hand member $128_H$ (e.g., also referred to as an end-effector 150). Here, the lower member $128_L$ may rotate or pivot about a first arm joint $J_{A1}$ located adjacent to the body 110 (e.g., where the arm 126 connects to the body 110 of the robot 100). The lower member $128_L$ is also coupled to the upper member $128_U$ at a second arm joint $J_{A2}$, while the upper member $128_U$ is coupled to the hand member $128_H$ at a third arm joint $J_{A3}$.

In some examples, such as in FIG. 1A, the hand member $128_H$ or end-effector 150 is a mechanical gripper that includes a moveable jaw and a fixed jaw configured to perform different types of grasping of elements within the environment 30. In the example shown, the end-effector $128_H$ includes a fixed first jaw and a moveable second jaw that grasps objects by clamping the object between the jaws. The moveable jaw is configured to move relative to the fixed jaw to move between an open position for the gripper and a closed position for the gripper (e.g., closed around an object).

In some implementations, the arm 126 additionally includes a fourth joint $J_{A4}$. The fourth joint $J_{A4}$ may be located near the coupling of the lower member $128_L$ to the upper member $128_U$ and functions to allow the upper member $128_U$ to twist or rotate relative to the lower member $128_L$. In other words, the fourth joint $J_{44}$ may function as a twist joint similarly to the third joint $J_{43}$ or wrist joint of the arm 126 adjacent the hand member $128_H$. For instance, as a twist joint, one member coupled at the joint J may move or rotate relative to another member coupled at the joint J (e.g., a first member coupled at the twist joint is fixed while the second member coupled at the twist joint rotates). In some implementations, the arm 126 connects to the robot 100 at a socket on the body 110 of the robot 100. In some configurations, the socket is configured as a connector such that the arm 126 attaches or detaches from the robot 100 depending on whether the arm 126 is needed for operation.

The robot 100 has a vertical gravitational axis (e.g., shown as a Z-direction axis $A_Z$) along a direction of gravity, and a center of mass CM, which is a position that corresponds to an average position of all parts of the robot 100 where the parts are weighted according to their masses (i.e., a point where the weighted relative position of the distributed mass of the robot 100 sums to zero). The robot 100 further has a pose P based on the CM relative to the vertical gravitational axis $A_Z$ (i.e., the fixed reference frame with respect to gravity) to define a particular attitude or stance assumed by the robot 100. The attitude of the robot 100 can be defined by an orientation or an angular position of the robot 100 in space. Movement by the legs 120 relative to the body 110 alters the pose P of the robot 100 (i.e., the combination of the position of the CM of the robot and the attitude or orientation of the robot 100). Here, a height generally refers to a distance along the z-direction (e.g., along the z-direction axis $A_Z$). The sagittal plane of the robot 100 corresponds to the Y-Z plane extending in directions of a y-direction axis $A_Y$ and the z-direction axis $A_Z$. In other words, the sagittal plane bisects the robot 100 into a left and a right side. Generally perpendicular to the sagittal plane, a ground plane (also referred to as a transverse plane) spans the X-Y plane by extending in directions of the x-direction axis $A_X$ and the y-direction axis $A_Y$. The ground plane refers to a ground surface 14 where distal ends 124 of the legs 120 of the robot 100 may generate traction to help the robot 100 move within the environment 30. Another anatomical plane of the robot 100 is the frontal plane that extends across the body 110 of the robot 100 (e.g., from a left side of the robot 100 with a first leg 120a to a right side of the robot 100 with a second leg 120b). The frontal plane spans the X-Z plane by extending in directions of the x-direction axis $A_X$ and the z-direction axis $A_z$.

In order to maneuver about the environment 30 or to perform tasks using the arm 126, the robot 100 includes a sensor system 130 with one or more sensors 132, 132. For example, FIG. 1A illustrates a first sensor 132, 132a mounted at a front of the robot 100 (i.e., near a front portion of the robot 100 adjacent the front legs 120a—b), a second sensor 132, 132b mounted near the hip of the second leg 120b of the robot 100, a third sensor 132, 132c corresponding to one of the sensors 132 mounted on a side of the body 110 of the robot 100, a fourth sensor 132, 132d mounted near the hip of the fourth leg 120d of the robot 100, and a fifth sensor 132, 132e mounted at or near the end-effector $128_H$ of the arm 126 of the robot 100. The sensors 132 may include vision/image sensors, inertial sensors (e.g., an inertial measurement unit (IMU)), force sensors, and/or kinematic sensors. Some examples of sensors 132 include a camera such as a stereo camera a visual red-green-blue (RGB) camera, or a thermal camera, a time-of-flight (TOF) sensor, a scanning light-detection and ranging (LIDAR) sensor, or a scanning 325 laser-detection and ranging (LADAR) sensor. Other examples of sensors 132 include microphones, radiation sensors, and chemical or gas sensors.

In some examples, the sensor 132 has a corresponding field(s) of view $F_V$ defining a sensing range or region corresponding to the sensor 132. For instance, FIG. 1A depicts a field of a view $F_V$ for the robot 100. Each sensor 132 may be pivotable and/or rotatable such that the sensor 132, for example, changes the field of view $F_V$ about one or more axis (e.g., an x-axis, a y-axis, or a z-axis in relation to a ground plane). In some examples, multiple sensors 132 may be clustered together (e.g., similar to the first sensor 132a) to stitch a larger field of view $F_V$ than any single sensor 132. With sensors 132 placed about the robot 100, the sensor system 130 may have a 360 degree view or a nearly 360 degree view (with respect to the X-Y or transverse plane) of the surroundings of the robot 100.

When surveying a field of view $F_V$ with a sensor 132, the sensor system 130 generates sensor data 134 (e.g., image data) corresponding to the field of view $F_V$. The sensor system 130 may generate the field of view $F_V$ with a sensor 132 mounted on or near the body 110 of the robot 100 (e.g., sensor(s) 132a, 132b). The sensor system may additionally and/or alternatively generate the field of view $F_V$ with a sensor 132 mounted at or near the end-effector 150 of the arm 126 (e.g., sensor(s) 132e). The one or more sensors 132 capture the sensor data 134 that defines the three-dimensional point cloud for the area within the environment 30 of the robot 100. In some examples, the sensor data 134 is image data that corresponds to a three-dimensional volumetric point cloud generated by a three-dimensional volumetric image sensor 132. Additionally or alternatively, when the robot 100 is maneuvering within the environment 30, the sensor system 130 gathers pose data for the robot 100 that includes inertial measurement data (e.g., measured by an IMU). In some examples, the pose data includes kinematic data and/or orientation data about the robot 100, for instance, kinematic data and/or orientation data about joints J or other portions of a leg 120 or arm 126 of the robot 100. With the sensor data 134, various systems of the robot 100 may use the sensor data 134 to define a current state of the robot 100 (e.g., of the kinematics of the robot 100) and/or a current state of the environment 30 about the robot 100. In other words, the sensor system 130 may communicate the sensor data 134 from one or more sensors 132 to any other system of the robot 100 in order to assist the functionality of that system.

In some implementations, the sensor system 130 includes sensor(s) 132 coupled to a joint J. Moreover, these sensors 132 may couple to a motor M that operates a joint J of the robot 100 (e.g., sensors 132, 132b-d). Here, these sensors 132 generate joint dynamics in the form of joint-based sensor data 134. Joint dynamics collected as joint-based sensor data 134 may include joint angles (e.g., an upper member $122_U$ relative to a lower member $122_L$ or hand member $128_H$ relative to another member of the arm 126 or robot 100), joint speed, joint angular velocity, joint angular acceleration, and/or forces experienced at a joint J (also referred to as joint forces). Joint-based sensor data generated by one or more sensors 132 may be raw sensor data, data that is further processed to form different types of joint dynamics, or some combination of both. For instance, a sensor 132 measures joint position (or a position of member(s) 122 coupled at a joint J) and systems of the robot 100 perform further processing to derive velocity and/or acceleration from the positional data. In other examples, a sensor 132 is configured to measure velocity and/or acceleration directly.

As the sensor system 130 gathers sensor data 134, a computing system 140 stores, processes, and/or to communicates the sensor data 134 to various systems of the robot 100 (e.g., the control system 170, a sensor pointing system 200, a navigation system 300, and/or remote controller 10, etc.). In order to perform computing tasks related to the sensor data 134, the computing system 140 of the robot 100 (which is schematically depicted in FIG. 1A and can be implemented in any suitable location(s), including internal to the robot 100) includes data processing hardware 142 and memory hardware 144. The data processing hardware 142 is configured to execute instructions stored in the memory hardware 144 to perform computing tasks related to activities (e.g., movement and/or movement based activities) for the robot 100. Generally speaking, the computing system 140 refers to one or more locations of data processing hardware 142 and/or memory hardware 144.

In some examples, the computing system 140 is a local system located on the robot 100. When located on the robot 100, the computing system 140 may be centralized (e.g., in a single location/area on the robot 100, for example, the body 110 of the robot 100), decentralized (e.g., located at various locations about the robot 100), or a hybrid combination of both (e.g., including a majority of centralized hardware and a minority of decentralized hardware). To illustrate some differences, a decentralized computing system 140 may allow processing to occur at an activity location (e.g., at motor that moves a joint of a leg 120) while a centralized computing system 140 may allow for a central processing hub that communicates to systems located at various positions on the robot 100 (e.g., communicate to the motor that moves the joint of the leg 120).

Additionally or alternatively, the computing system 140 can utilize computing resources that are located remote from the robot 100. For instance, the computing system 140 communicates via a network 180 with a remote system 160 (e.g., a remote server or a cloud-based environment). Much like the computing system 140, the remote system 160 includes remote computing resources such as remote data processing hardware 162 and remote memory hardware 164. Here, sensor data 134 or other processed data (e.g., data processing locally by the computing system 140) may be stored in the remote system 160 and may be accessible to the computing system 140. In additional examples, the computing system 140 is configured to utilize the remote resources 162, 164 as extensions of the computing resources 142, 144 such that resources of the computing system 140 reside on resources of the remote system 160.

In some implementations, as shown in FIGS. 1A and 1B, the robot 100 includes a control system 170. The control system 170 may be configured to communicate with systems of the robot 100, such as the at least one sensor system 130, the navigation system 300 (e.g., with navigation commands 302), and/or the sensor pointing system 200 (e.g., with body pose commands 230). The control system 170 may perform operations and other functions using the computing system 140. The control system 170 includes at least one controller 172 that is configured to control the robot 100. For example, the controller 172 controls movement of the robot 100 to traverse about the environment 30 based on input or feedback from the systems of the robot 100 (e.g., the sensor system 130 and/or the control system 170). In additional examples, the controller 172 controls movement between poses and/or behaviors of the robot 100. At least one the controller 172 may be responsible for controlling movement of the arm 126 of the robot 100 in order for the arm 126 to perform various tasks using the end-effector 150. For instance, at least one controller 172 controls the end-effector 150 (e.g., a gripper) to manipulate an object or element in the environment 30. For example, the controller 172 actuates the movable jaw in a direction towards the fixed jaw to close the gripper. In other examples, the controller 172 actuates the movable jaw in a direction away from the fixed jaw to close the gripper.

A given controller 172 may control the robot 100 by controlling movement about one or more joints J of the robot 100. In some configurations, the given controller 172 is software or firmware with programming logic that controls at least one joint J and/or a motor M which operates, or is coupled to, a joint J. A software application (i.e., a software resource) may refer to computer software that causes a computing device to perform a task. In some examples, a software application may be referred to as an "application," an "app," or a "program." For instance, the controller 172 controls an amount of force that is applied to a joint J (e.g., torque at a joint J). As programmable controllers 172, the number of joints J that a controller 172 controls is scalable and/or customizable for a particular control purpose. A controller 172 may control a single joint J (e.g., control a torque at a single joint J), multiple joints J, or actuation of one or more members 128 (e.g., actuation of the hand member $128_H$) of the robot 100. By controlling one or more joints J, actuators or motors M, the controller 172 may coordinate movement for all different parts of the robot 100 (e.g., the body 110, one or more legs 120, the arm 126). For example, to perform a behavior with some movements, a controller 172 may be configured to control movement of multiple parts of the robot 100 such as, for example, two legs 120a-b, four legs 120a-d, or two legs 120a-b combined with the arm 126. In some examples, a controller 172 is configured as an object-based controller that is setup to perform a particular behavior or set of behaviors for interacting with an interactable object.

With continued reference to FIG. 1B, an operator 12 (also referred to herein as a user or a client) may interact with the robot 100 via the remote controller 10 that communicates with the robot 100 to perform actions. For example, the operator 12 transmits commands 174 to the robot 100 (executed via the control system 170) via a wireless communication network 16. Additionally, the robot 100 may communicate with the remote controller 10 to display an image on a user interface 190 (e.g., UI 190) of the remote controller 10. For example, the UI 190 is configured to display the image that corresponds to three-dimensional field of view Fv of the one or more sensors 132. The image displayed on the UI 190 of the remote controller 10 is a two-dimensional image that corresponds to the three-dimensional point cloud of sensor data 134 (e.g., field of view Fv) for the area within the environment 30 of the robot 100. That is, the image displayed on the UI 190 may be a two-dimensional image representation that corresponds to the three-dimensional field of view Fv of the one or more sensors 132.

Figure 2:
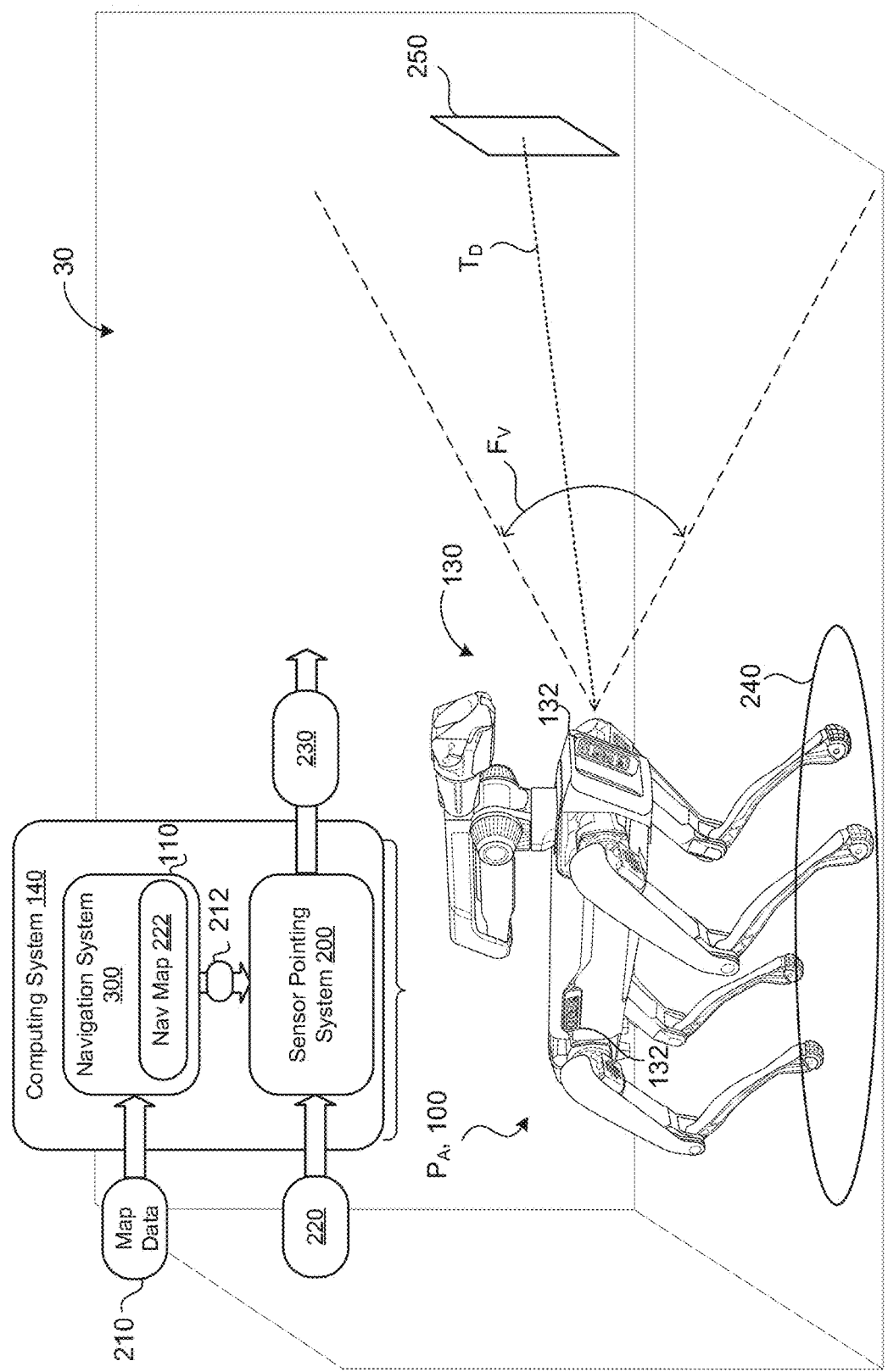
FIG. 2 is a schematic view of a robot with a sensor pointing system according to one embodiment.

In some implementations, as shown in FIG. 2, the robot 100 is located in the environment 30 and is equipped with the sensor system 130 that includes the sensor 132 (disposed on the body 110, in this example) on the robot 100 and having a field of view Fv that includes at least a portion of the environment 30 surrounding the robot 100. The computing system 140 of the robot 100 is equipped with data processing hardware and memory hardware with the memory hardware including instructions to be executed by the data processing hardware. The computing system 140 is configured to operate the navigation system 300 and the sensor pointing system 200 (for instance, in autonomous inspection applications) to navigate the robot 100 to a POI and uses a sensor 132 to capture sensor data 134 at the POI in a particular way all without user input or supervision.

In the illustrated embodiment, the computing system 140 includes the navigation system 300 that generates or receives a navigation map 222 from map data 210 obtained by the computing system 140. The navigation system 300 generates a route path 212 that plots a path around large and/or static obstacles from a start location (e.g., the current location of the robot 100) to a destination. The navigation system 300 is in communication with the sensor pointing system 200. The sensor pointing system 200 may receive the route path 212 or other data from the navigation system 300 in addition to sensor data 134 from the sensor system 130.

The sensor pointing system 200 receives a sensor pointing command 220 (e.g., from the user 12) that directs the robot 100 to capture sensor data 134 of a target location 250 (e.g., a specific area or a specific object in a specific area) and/or in a target direction $T_D$. The sensor pointing command 220 may include one or more of the target location 250, the target direction $T_D$, an identification of a sensor 132 (or multiple sensors) to capture sensor data 134 with, etc. When the robot is proximate the target location, the sensor pointing system 200 generates one or more body pose commands 230 (e.g., to the control system 170) to position the sensor 132 such that the target location 250 and/or the target direction $T_D$ are within the field of sensing of the sensor 132. For example, the sensor pointing system 200 determines necessary movements of the sensor 132 and/or of the robot 100 (i.e., adjust a position or orientation or pose P of the robot) to align the field of sensing of the sensor 132 with the target location 250 and/or target direction $T_D$.

In some examples, and as discussed in more detail below, the sensor pointing system 200 directs the pose P of the robot 100 to compensate for a sensed error in sensor 132 configuration or orientation. For example, the robot 100 may alter its current pose P to accommodate a limited range of motion of the field of view $F_V$ of the sensor, avoid occluding the captured sensor data, or match a desired perspective of the target location 250. Thus, in some implementations, the sensor pointing system 200, based on an orientation of the sensor 132 relative to the target location 250, determines the target direction $T_D$ to point the sensor 132 toward the target location 250.

Alternatively or additionally, the sensor pointing system determines an alignment pose $P_A$ of the robot to cause the sensor 132 to point in the target direction $T_D$ toward the target location 250. The sensor pointing system 200 may command the robot 100 to move to the alignment pose $P_A$ to cause the sensor 132 to point in the target direction $T_D$. After the robot 100 moves to the alignment pose $P_A$, and with the sensor 132 pointing in the target direction $T_D$ toward the target location 250, the sensor pointing system 200 may command the sensor 132 to capture sensor data 134 of the target location 250 in the environment 30.

In other words, the computing system 140 is configured to receive the sensor pointing command 220 (e.g., from the user 12) that, when implemented, commands the robot 100 to capture sensor data 134 using the sensor 132 (or multiple sensors) disposed on the robot 100. Based on the orientation of the sensor 132 relative to the target location 250, the sensor pointing system 200 determines the target direction $T_D$ and the alignment pose P of the robot 100. The determined target direction $T_D$ points the sensor 132 toward the target location 250 and the determined alignment pose $P_A$ of the robot 100 causes the sensor 132 to point in the target direction $T_D$ toward the target location 250. The sensor pointing system 200 may command the robot 100 to move from a current pose P of the robot 100 to the alignment pose $P_A$ of the robot. After the robot 100 moves to the alignment pose $P_A$ and with the sensor 132 pointing in the target direction $T_D$ toward the target location 250, the sensor pointing system 200 commands the sensor 132 to capture sensor data 134 of the target location 250 in the environment 30.

As will become apparent from this disclosure, the sensor pointing system 200, along with other features and elements of the methods and systems disclosed herein, make the data capture of target locations 250 in environments 30 repeatable and accurate as the robot 100 is sensitive to sensed and unsensed error in the robot's position, orientation, and sensor configuration. The sensor pointing system 200 allows the robot 100 to overcome odometry and sensor error when capturing sensor data 134 relative to the target location 250 at least in part by determining the target direction $T_D$ for pointing the sensor 132 at the target location 250 and the alignment pose $P_A$ for achieving the target direction $T_D$ based on the orientation of the sensor 132 relative to the target location 250.

In some examples, in response to receiving the sensor pointing command 220, the sensor pointing system 200 commands the robot 100 to navigate to a target point of interest (POI) 240 within the environment 30. In such examples, the sensor pointing system 200 determines the target direction $T_D$ and the alignment pose $P_A$ of the robot 100 after the robot 100 navigates to the target POI 240.

Figure 3:
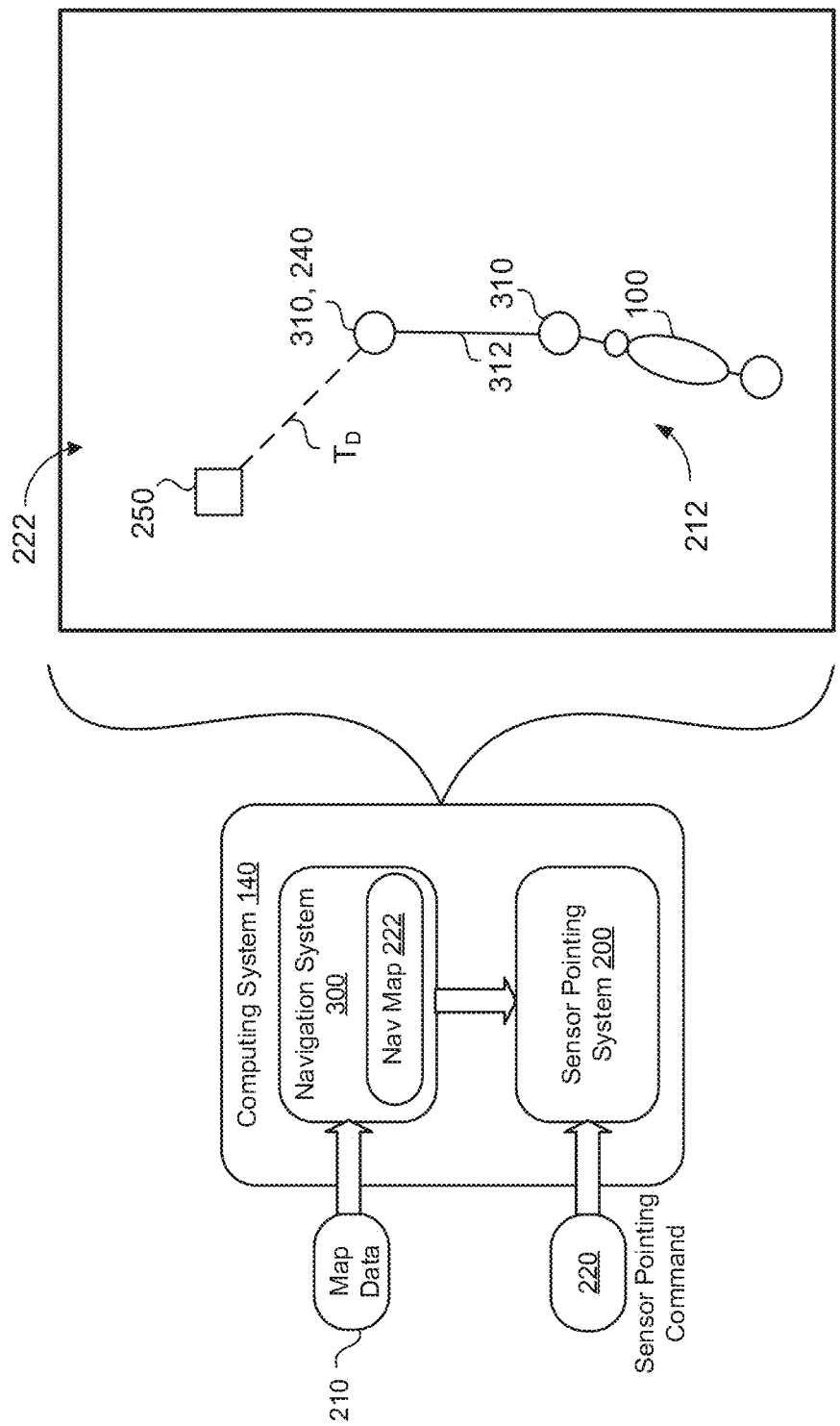
FIG. 3 is a schematic view of a robot navigating to a point of interest to capture sensor data according to one embodiment.

Referring now to FIG. 3, in some examples, the navigation system 300 (e.g., based on map data 210, sensor data 134, etc.) generates a series of route waypoints 310 on the graph map 222 for the navigation route 212 that plots a path around large and/or static obstacles from a start location (e.g., the current location of the robot 100) to a destination (e.g., the target POI 240). Route edges 312 connect corresponding pairs of adjacent route waypoints 310. The robot 100, when navigating the environment 30, travels from route waypoint 310 to route waypoint 310 by traversing along the route edges 312. In some examples, the target POI 240 is a route waypoint 310 on the navigation map 222. In the example shown, the robot 100 travels along the navigation route 212 until reaching the target POI 240 (i.e., a specified route waypoint 310). In some examples, the target POI 240 is the final route waypoint 310 along the navigation route 212, while in other examples, the navigation route 212 continues on with additional route waypoints 310 and route edges 320 for the robot 100 to continue along after capturing the sensor data 134 at the target POI 240 and the navigation route 212 may include any number of target POIs 240 for capturing sensor data 134 at various locations along the navigation route 212.

Thus, based on guidance provided by the navigation system 300, the robot 100 arrives at a route waypoint 310 defined by the target POI 240. After arrival at the waypoint, the sensor pointing system 200 may determine an orientation of the sensor 132 relative to the target location 250. Based on the orientation of the sensor 132 relative to the target location 250, the sensor pointing system 200 determines the target direction $T_D$ for pointing the sensor 132 toward the target location 250.

Figure 4:
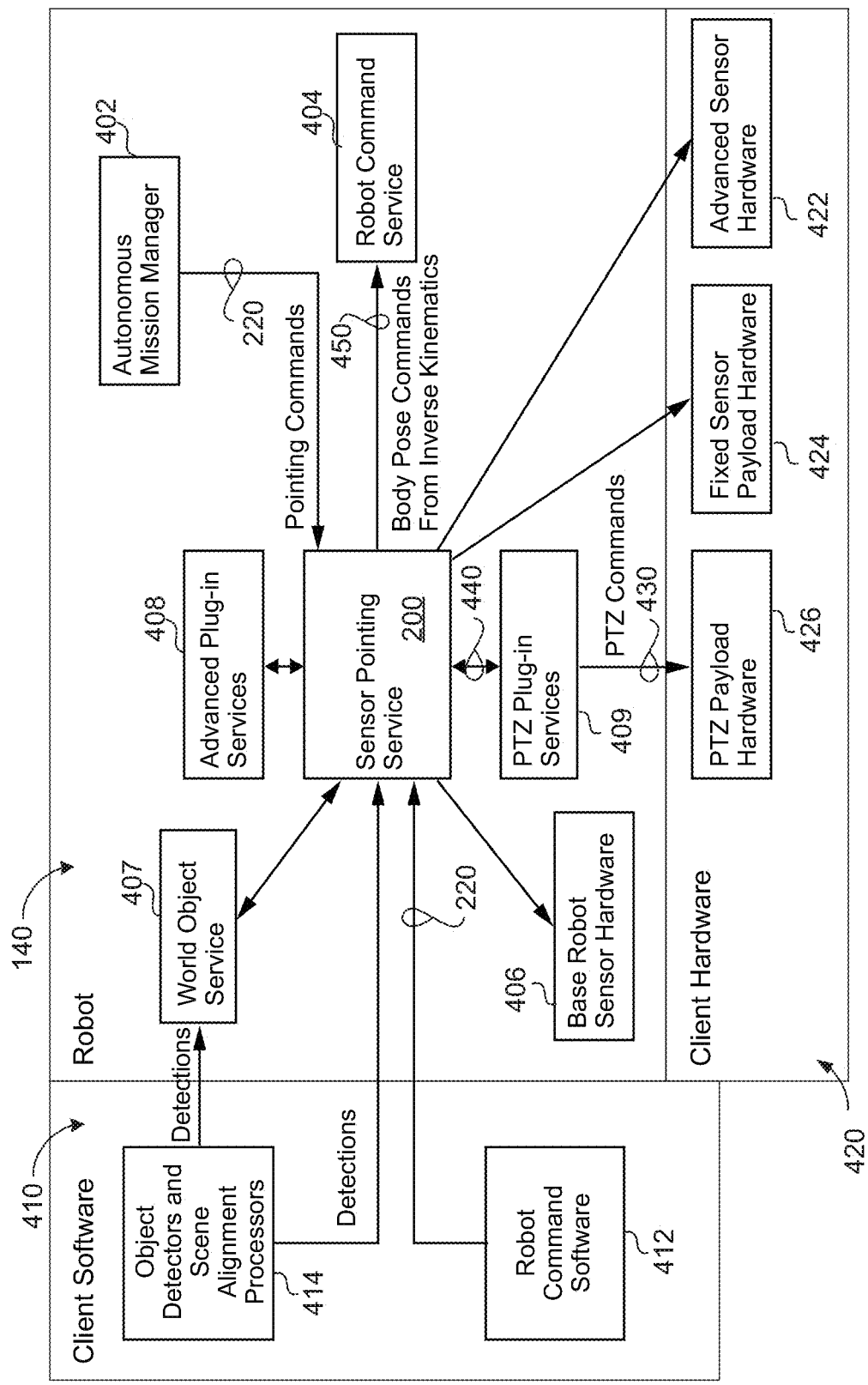
FIG. 4 is a schematic view of a sensor pointing system according to one embodiment.

Although examples herein (e.g., FIG. 2) illustrate the sensor 132 integrated into the body of the robot 100 at a front portion of the robot 100 with a field of view $F_V$ primarily forward of the robot, the sensor 132 (or sensors) may be disposed in any suitable manner on the robot 100. The sensor 132 may include any number of different types of sensors such as a camera, LIDAR, and/or microphone. For example, the sensor 132 may be built into the body 110 of the robot 100 or attached as a payload. In some examples, the sensor 132 is disposed on the articulated arm 126. Additionally, the sensor 132 may be permanently fixed to the robot 100 as part of its original manufacture or alternatively disposed or mounted at the robot 100 (e.g., client hardware) and connected to the sensor pointing system 200 via client software (FIG. 4). The sensor 132 may have any fixed or pivotable (e.g., a pan-tilt-zoom (PTZ) sensor such as a PTZ camera) field of view/field of sensing. Because the orientation of the sensor 132 is based at least in part on the pose P of the robot 100, movement of the robot 100, such as to the alignment pose $P_A$, changes the field of view of the sensor 132.

The target direction $T_D$, in some examples, is parameterized by the sensor pointing command 220. In other words, the sensor pointing command 220 may include instructions as to how the sensor data 134 of the target location 250 should be captured, such as from a certain direction, angle, zoom, focus, and/or distance relative to the target location 250 or with the target location 250 framed a certain way in the field of view $F_V$ of the sensor. Thus, the sensor pointing command 220 may include parameters for capturing sensor data 134 of the target location 250, such as angle, height, proximity, and direction of the sensor relative to the target location, and parameters related to placement of the target location 250 within the captured sensor data 134. The parameters may also include configuration for the sensor 132 while capturing the sensor data 134 (e.g., zoom, focus, exposure, control of illumination sources, etc.). The sensor pointing system 200 may determine the target direction $T_D$ based on the parameters of the sensor pointing command 220. Alternatively, the target direction $T_D$ may be provided by the sensor pointing command 220. Based on the parameters of the sensor pointing command 220 and/or the target direction $T_D$, the sensor pointing system 200 commands the robot 100 (e.g., to the alignment pose $P_A$) and/or sensor to move to orient the sensor 132 toward the target location 250.

Referring now to FIGS. 1B and 4, the sensor pointing system 200 may determine the target direction $T_D$ and the alignment pose $P_A$ in response to receiving the sensor pointing command 220. The sensor pointing command 220 may originate from an onboard autonomous mission manager 402 (i.e., generated from mission data or parameters, robot configuration, etc.) and/or from client software 410 that includes robot command software 412. Thus, the user 12 may communicate sensor pointing commands 220 to the robot (e.g., wirelessly via the controller 10) or robot 100 may generate the sensor pointing command(s) within the context of an autonomous mission. Here, the sensor pointing system 200 includes a sensor pointing service 200. The sensor pointing commands 220 are communicated to the sensor pointing service 200 (e.g., by the autonomous mission manager 402 or the robot command software 412) to determine the target direction $T_D$ and sensor configurations for capturing the sensor data 134.

In some implementations, the client software 410 (in communication with the computing system 140 of the robot 100) includes object detectors and scene alignment processors 414 that process the sensor data 134 captured by the sensor 132. For example, the object detectors detect objects present in captured image data. In other implementations, the sensor pointing system 200 includes the object detectors and/or scene alignment processors and processes the sensor data 134 automatically. The client software 410 may execute locally at the robot 100 or may execute remote from the robot 100 (e.g., at the controller 10, the remote system 160, or at any other server exterior the robot 100 and in communication with the computing system 140 of the robot 100).

The sensor pointing system 200 may also be in communication with the mechanical systems of the robot 100. For example, as shown in FIG. 4, the sensor pointing system 200 may communicate the body pose commands 230 to a robot command service 404 of the computing system 140, and various sensors 132 disposed at or in communication with the robot 100, such as base robot sensor hardware 406, advanced plug-in sensors 408, and client hardware 420. For example, the client hardware 420, includes advanced sensor hardware 422, fixed sensor hardware 424, and a pan-tilt-zoom (PTZ) sensor payload 426 at the robot 100. In certain implementations, the robot 100 can be instructed to move in multiple command ways, including both map navigation and robot commands.

In some implementations, the PTZ payload hardware 426 (e.g., a sensor 132) communicates with PTZ plug-in services 409 at the robot which is operable to, for example, receive sensor data 134 from the PTZ payload hardware 426 and communicate PTZ commands 430 to the PTZ payload hardware 426. The PTZ plug-in service 409 may be sensor specific (i.e., a hardware interface) and thus likely to execute client-side (i.e., external to the robot 100). In some examples, the PTZ plug-in services 409 execute within the sensor 132. In some implementations, the PTZ payload hardware 426 is a sensor 132 (e.g., a PTZ camera) temporarily mounted to or connected with the robot 100. The sensor pointing system 200 may delegate reconfiguration of the PTZ payload hardware 426 to the PTZ plug-in 409.

When the robot includes a PTZ sensor 132, and after the system obtains or determines the target direction $T_D$ for pointing the PTZ sensor 132 toward the target location 250, the sensor pointing system 200 may sense or detect and correct any existing error (i.e., discrepancy) between the current direction of the PTZ sensor 132 (e.g., a vector along the center of the field of sensing of the PTZ sensor 132) and the target direction $T_D$. The center of the field of sensing refers to a vector that originates at the PTZ sensor 132 and extends away from the PTZ sensor 132 such that the sensor's field of sensing to the left and to the right of the vector are of equivalent size and the sensor's field of sensing above and below the vector are of equivalent size.

In such implementations, the sensor pointing system 200 determines whether the center of a field of sensing of the PTZ sensor 132 (or other sensor) is aligned with the target direction $T_D$ and, if the center of field of sensing, (i.e., the "aim") of the PTZ sensor 132 is not aligned with the target direction $T_D$, the sensor pointing system 200 determines PTZ alignment parameters for aligning the center of the field of sensing of the PTZ sensor 132 with the target direction $T_D$. Furthermore, the sensor pointing system 200 may command the PTZ sensor 132, e.g., using the PTZ alignment parameters, to adjust the center of the field of sensing of the PTZ sensor 132 (e.g., commanding the PTZ sensor 132 to pan, tilt, and/or zoom) to align with the target direction $T_D$. Thus, the target direction $T_D$ may be parameterized, at least in part, by PTZ alignment parameters.

In some implementations, after commanding the PTZ sensor 132 to adjust the center of the field of sensing of the PTZ sensor, the sensor pointing system 200 receives, from the PTZ sensor 132 (e.g., via the PTZ plug-in services 409), alignment feedback data 440. The alignment feedback data 440 indicates the current PTZ parameters of the PTZ sensor 132. That is, the alignment feedback data 440 indicates the current orientation of the PTZ sensor 132 relative to the pose P of the robot 100. In some examples, the sensor pointing system 200 determines a difference, based on the alignment feedback data 440, between the current alignment 510 (FIG. 5) of the center of the field of sensing of the PTZ sensor 132 and the target direction $T_D$. When there is a difference (e.g., above a threshold difference), the sensor pointing system 200 determines, based on the difference between the current alignment of the center of the field of sensing of the PTZ sensor 132 and the target direction $T_D$, the alignment pose $P_A$ that will correct the difference between the pointing direction of the PTZ sensor 132 and the target direction $T_D$. Thus, in these examples, determining the alignment pose $P_A$ of the robot 100 is based on the received alignment feedback data 440 from the PTZ sensor 132. In other examples, such as when the sensor 132 is fixed, alignment of the sensor 132 relies entirely on the alignment post $P_A$ of the robot 100.

Figure 5:
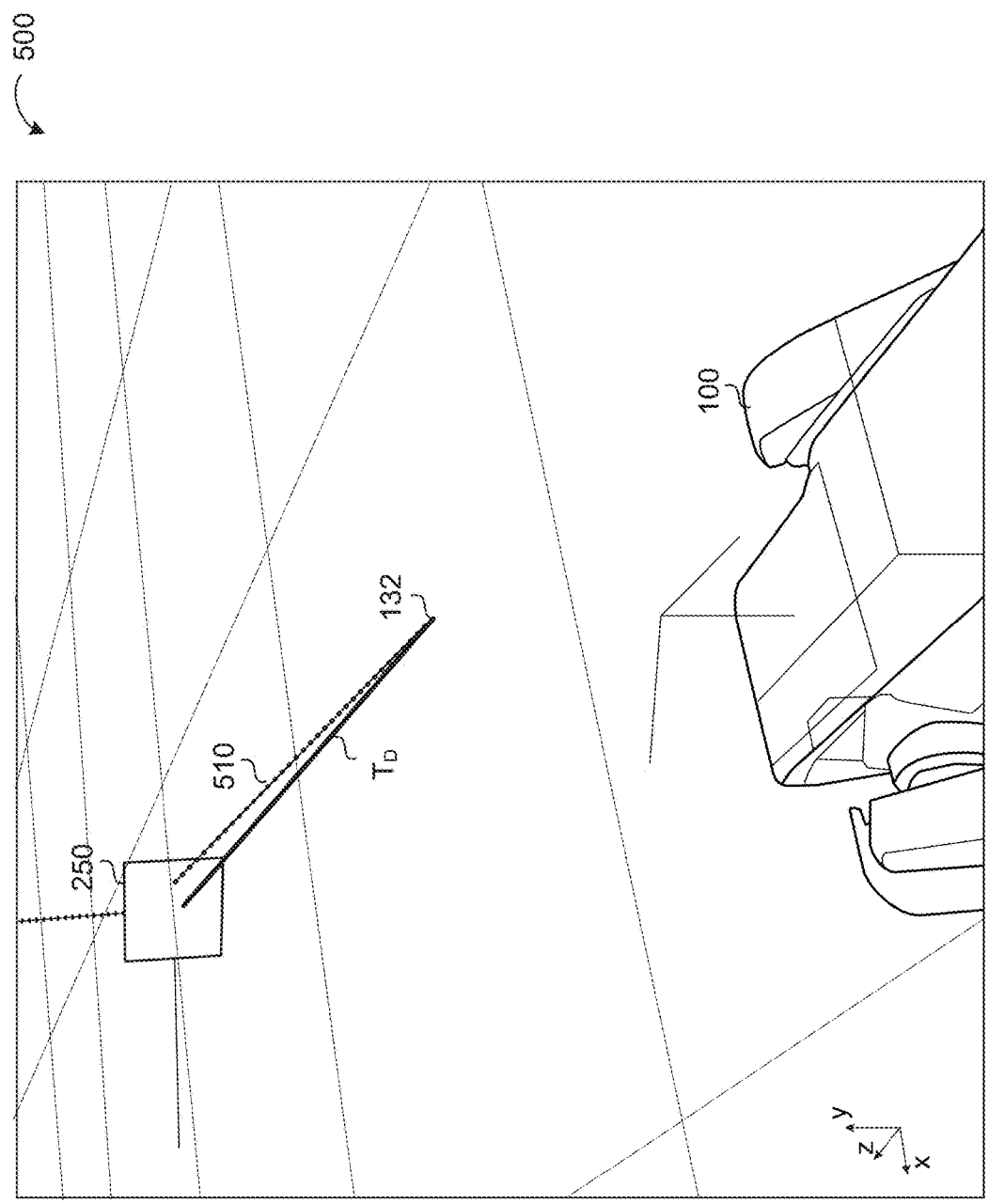
FIG. 5 is a schematic view of a robot executing a sensor pointing command on a detected object according to one embodiment.

Referring now to FIG. 5, a schematic view 500 includes a three dimensional (3D) representation of a portion of the robot 100 and the target location 250. Here, the sensor pointing system 200 has commanded the sensor 132 (e.g., a PTZ sensor 132) to align with the target direction $T_D$, however, the alignment feedback data 440 from the PTZ sensor 132 indicates a difference or error between a current alignment 510 of the sensor 132 (i.e., and adjusted center of the field of sensing) and the target direction $T_D$, where the target direction $T_D$ and the current alignment 510 are represented by respective vectors to the target location 250 and originating at the sensor 132. For example, the alignment error can arise from a variety of sources, for instance, the PTZ sensor 132 encountered a failure or the commanded orientation would require the PTZ sensor 132 to move beyond its capabilities (i.e., insufficient range of motion) or the field of sensing may be occluded by a portion of the sensor 132 itself or a portion of the robot 100. Based on the error or difference or discrepancy between the current alignment 510 of the PTZ sensor 132 and the target direction $T_D$, the sensor pointing system 200 determines an alignment pose $P_A$ for the robot 100 that will adjust the orientation of the PTZ sensor 132 such that the sensor will point at the target location 250 in the target direction $T_D$. Thus, the initial alignment of the PTZ sensor 132 and alignment feedback data 440 from the PTZ sensor 132 indicating the error between the current alignment 510 and the target direction $T_D$, in this example, results in the sensor pointing system 200 determining the alignment pose $P_A$ for pointing the PTZ sensor 132 at the target location 250 in the target direction $T_D$. The sensor pointing system 200 may command the robot 100 to move the current pose P to the determined alignment pose $P_A$ prior to capturing sensor data 134 with the sensor 132.

The sensor pointing command 220 may parameterize the target direction $T_D$ in other manners to capture the desired sensor data 134 of the target location 250. For example, the sensor pointing command 220 may parameterize the target direction $T_D$ as a selected direction, a selected ray or vector (e.g., that originates from the robot 100 or the sensor 132), or based on a point relative to one of any known coordinate frames of the robot 100. In such implementations, the sensor pointing command 220 may include a user input indication indicating selection of a ray or a point relative to a known coordinate frame of the robot 100. The user input indication may constitute the target location 250 and the sensor pointing system may determine the target direction $T_D$ and/or the alignment pose $P_A$ of the robot 100 to point or aim the sensor 132 in such a way that the user input indication is at the center of the field of view of the sensor 132.

In some implementations, the sensor pointing command 220 parameterizes the target direction $T_D$ based on object detection capabilities of the robot 100, such as enabled by an object data base or world object service 407 (FIG. 4) of the computing system 140 of the robot 100. The object database 407 stores objects that the robot 100 has previously detected or may receive detection information from object detectors 414 of the client software 410. Object detection may be performed by any system remote or local to the robot 100. For example, the computing system 140 may receive object detection indications from the client software 410 or may receive object detections or perform object detection at the world object service portion 407 of the computing system 140. Additionally, the sensor pointing system 200 may determine the target direction $T_D$ based on the orientation of the sensor 132 relative to the target location 250 based at least in part on detecting an object that is at, near, or defines the target location 250. In these examples, the target direction $T_D$ may be based on an aspect or feature of the detected object.

In some examples, the sensor pointing command 220 may parameterize the target direction $T_D$ via a two dimensional (2D) or 3D model of an object in an object database or world object service 407 of the computing system 140 of the robot 100 (FIG. 4). In this scenario, the model of the object defines the target location 250 or is at or near the target location 250 in the environment. For example, the sensor pointing command 220 includes a model of an object that is to be detected and the target direction $T_D$ is intended to point the sensor 132 at a particular portion of the detected object or to point the sensor 132 in a particular orientation relative to the detected object.

In some examples, before aligning the sensor 132 in the target direction $T_D$ to capture sensor data 134 of the target location 250, the sensor pointing system 200 captures image data 134 of the environment 30 using a camera 132. Using the provided model of the object, the sensor pointing system 200 determines whether the object is present in the captured image data 134. When the object is present in the captured image data 134, the sensor pointing system 200 may determine the target direction $T_D$ relative to the detected object. For example, the determined target direction $T_D$ may center the object within a field of view $F_V$ of the sensor 132. In some examples, the sensor 132 is controllable to move relative to the body of the robot such that the sensor 132 adjusts to align the sensor 132 in the target direction $T_D$ in combination with, or without, changing the pose of the robot 100.

In some examples, the sensor pointing command 220 parameterizes the target direction $T_D$ via an object classification of an object to be detected. In such examples, the sensor pointing command 220 includes an object classification. The object classification is an output of the object detector that matches detected objects to corresponding classifications. Thus, the sensor pointing command 220 may include a category or classification of object(s) to be detected, and the sensor pointing command 220 is parameterized relative to the indicated classification.

In certain implementations, before aligning the sensor 132 in the target direction $T_D$ to capture sensor data 134 of the target location 250, the sensor pointing system 200 captures image data 134 of the environment 30 using the camera 132. The sensor pointing system 200 processes the captured image data 134 to detect an object and determines a classification of the detected object. Using the output of the object detector, the sensor pointing system 200 determines whether the classified object is present in the captured image data 134. When the classified object is present in the captured image data 134, the sensor pointing system 200 determines the target direction $T_D$ of the sensor 132 relative to the classified object. For example, the sensor pointing system 200 determines the target direction $T_D$ to center the classified object within a field of view $F_V$ of the sensor 132.

Thus, when the robot 100 is in the environment 30, the sensor pointing system 200 may perform object detection to determine whether an object is present in the environment 30 and whether the detected object matches a model of an object or a classification of an object provided to the system. The sensor pointing system 200 may scan a portion of the environment (e.g., based on parameters in the sensor pointing command 220 such as a requested direction) in an attempt to acquire the location of the object. When the modeled object or classified object is present, the sensor pointing system 200 determines the target direction $T_D$ relative to the object and the necessary PTZ commands 430 and/or alignment pose $P_A$ to align the field of sensing of the sensor 132 with the target direction $T_D$. The determined target direction $T_D$ and corresponding alignment pose P may be relative to a feature or aspect of an object detected using the model of the object or that satisfies the provided object classification.

The sensor pointing command 220, in some implementations, parameterizes the target direction $T_D$ based on scene alignment, where determining the alignment pose $P_A$ of the robot 100 that aligns the sensor 132 in the target direction $T_D$ involves processing image data 134 captured by a second sensor 132 different from a primary sensor 132 pointed in the target direction $T_D$ and capturing sensor data of the target location 250. For example, a camera 132 disposed at the robot 100 captures image data 134 of the environment 30 and the sensor pointing system 200 uses the captured image data 134 to confirm or correct alignment of the primary sensor 132 (e.g., a LIDAR sensor, a directional microphone, etc.) with the target direction $T_D$. The sensor pointing system 200 may also use a reference image of the target location 250 and compare the reference image to captured image data 134. The sensor pointing system 200 then derives a transformation from the comparison and determines a target direction $T_D$ and alignment pose P to achieve the transformation from the captured image data 134 to the reference image.

Referring back to FIG. 4, once the target direction $T_D$ is determined based on, for example, the orientation of the sensor 132 relative to the target location 250, the sensor pointing system 200 may determine the alignment pose $P_A$ of the robot 100 to cause the sensor 132 to point in the target direction $T_D$ toward the target location 250. The sensor pointing system 200 produces body pose commands 450 to command the robot 100 from its current pose P to the alignment pose $P_A$. For example, the sensor pointing system 200 determines the alignment pose $P_A$ and body pose commands 450 from inverse kinematics of the robot 100. The body pose commands 450 may be communicated to a robot command service 404 of the computing system 140 of the robot 100, which controls the mechanical systems of the robot 100 responsive to the body pose commands 450 to achieve the alignment pose P.

Figure 6:
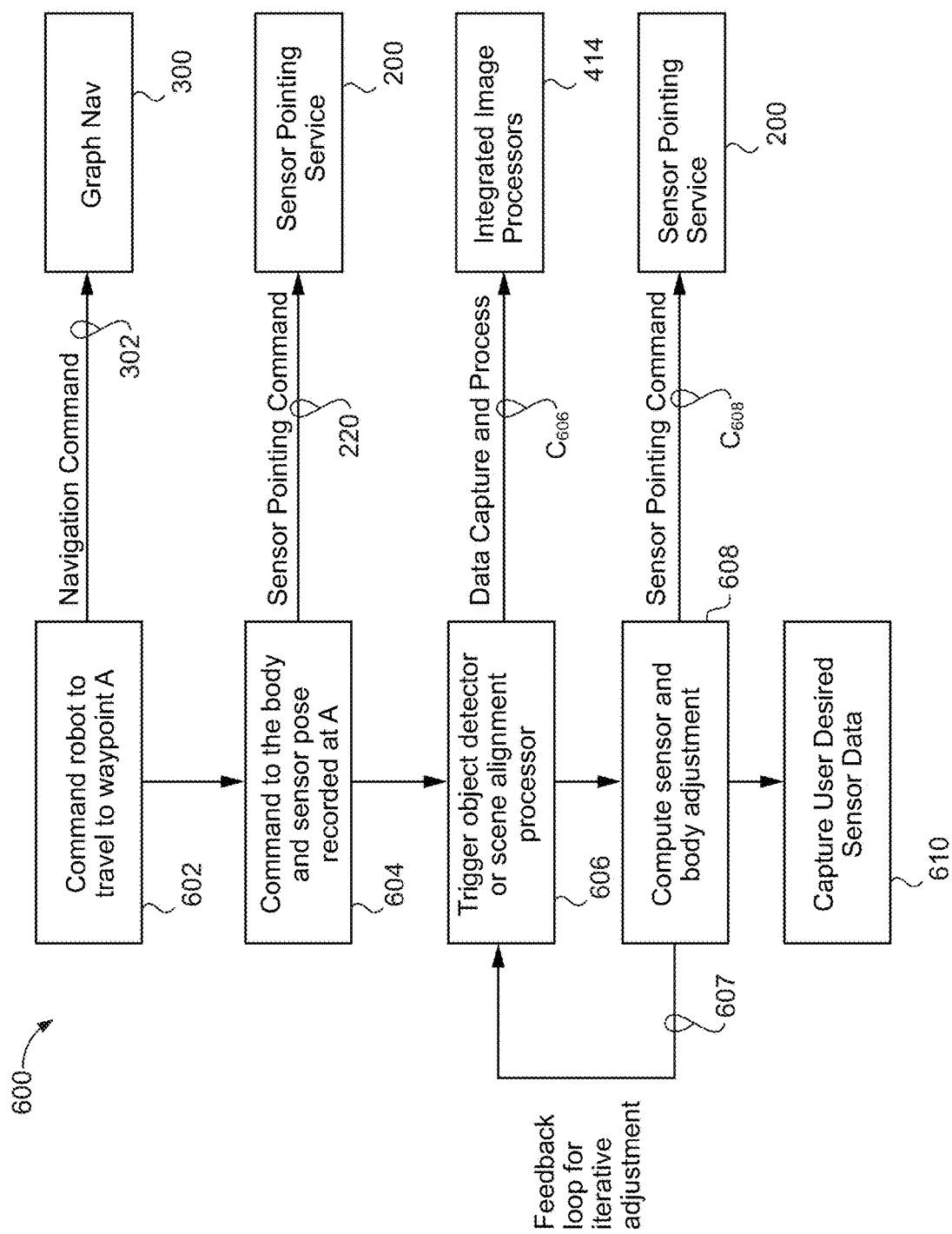
FIG. 6 is a schematic view of one embodiment of a flow chart for capturing sensor data using a sensor pointing command.

Referring now to FIG. 6, a flow chart 600 discloses one embodiment of a process for implementing a sensor pointing command 220. Here, the target direction $T_D$ is parameterized via object detection and/or scene alignment, where captured image data 134 is processed to at least guide the sensor pointing command 220 to align the sensor 132 and the target direction $T_D$. The process 600 includes a feedback loop 607 for iterative adjustment of the sensor 132 and body adjustment. To begin, the user 12 may specify a mission for the robot 100 and at step 602, a command commands the robot 100 to navigate to a target POI 240 (i.e., waypoint A) in the environment 30. The command may be at least in part responsive to receiving the sensor pointing command 220 or a separate navigation command 302. The navigation command 302 is communicated and implemented by the navigation system 300 of the robot 100. At step 604, the sensor pointing command 220 is communicated to the sensor pointing system 200 which determines the target direction $T_D$ and alignment pose $P_A$ of the robot 100. Before capturing the sensor data 134, the appropriate object detector or scene alignment processor 414 is triggered at step 606 and a command $C_{606}$ to capture and process image data is communicated to the image sensor 132 and integrated image processors 414. Sensor and body pose adjustments are calculated at step 608 with an iterative feedback loop 607 providing repeated sensor and body adjustments based on the captured image data, as necessary. In other words, if needed, a command $C_{608}$ may be communicated to the sensor pointing system 200 at step 608, based on the iterative feedback loop 607, to adjust the sensor 132 and/or body pose P. At step 610, with the robot 100 in the alignment pose $P_A$ and the sensor 132 pointed in the target direction $T_D$ toward the target location 250, the sensor 132 captures sensor data of the target location 250.

Figure 7:
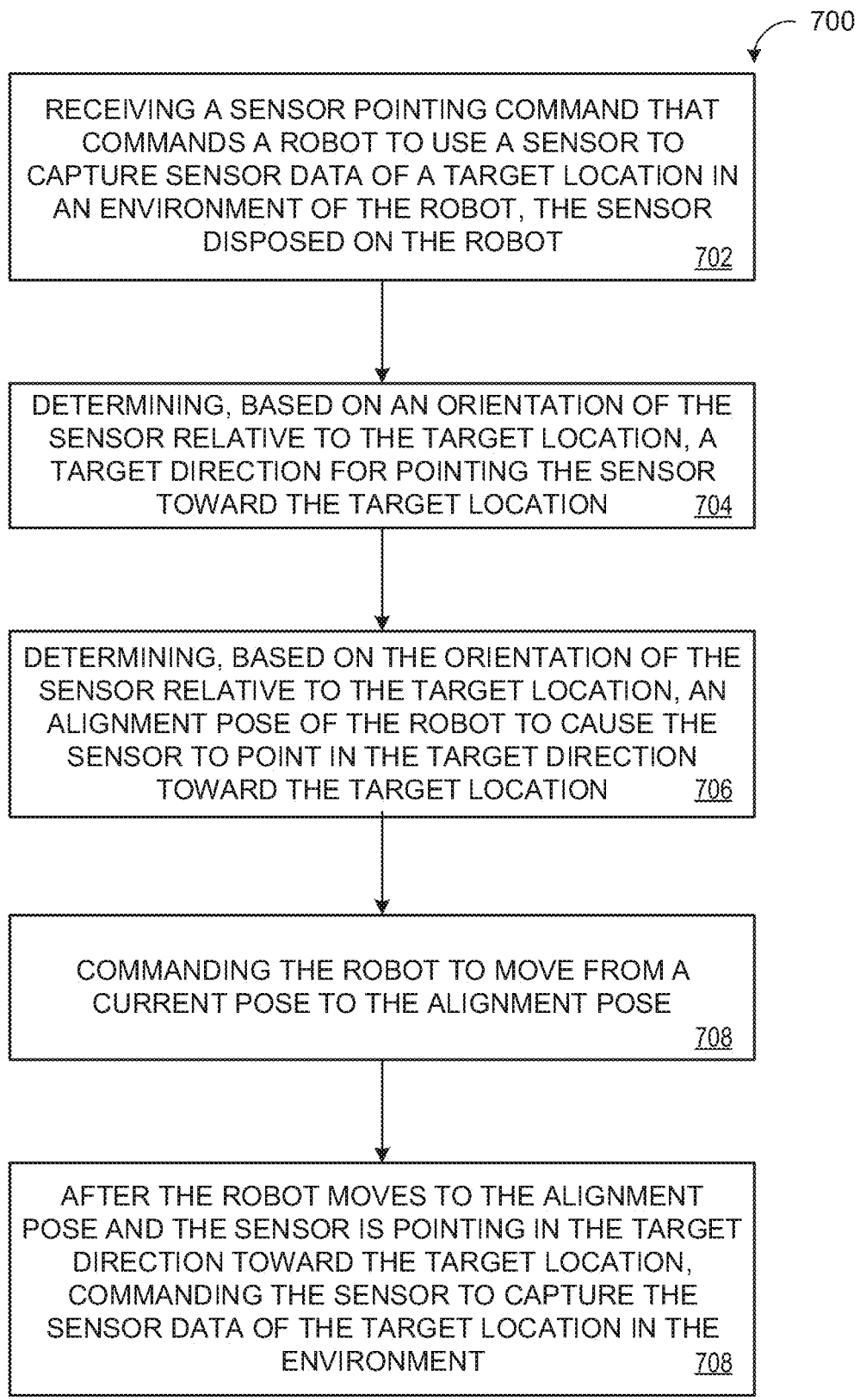
FIG. 7 is a flowchart of an example arrangement of operations for a method of autonomous and teleoperated sensor pointing on a mobile robot.

FIG. 7 is a flowchart of one embodiment of a method 700 for autonomous and teleoperated sensor pointing on a mobile robot. The method 700, at step 702, includes receiving a sensor pointing command 220 that commands the robot 100 to use a sensor 132 to capture sensor data 134 of a target location 250 in an environment 30 of the robot. The sensor 132 is disposed on or at the robot 100. At step 704, the method 700 includes determining, based on the orientation of the sensor 132 relative to the target location 250, the target direction $T_D$ for pointing the sensor 132 toward the target location 250. At step 706, the method 700 includes determining, based on the orientation of the sensor 132 relative to the target location 250, the alignment pose $P_A$ of the robot 100 to cause the sensor 132 to point in the target direction $T_D$ toward the target location 250. At step 708, the method 700 includes commanding the robot 100 to move from its current pose P to the alignment pose $P_A$. The method 700, at step 710, includes, after the robot 100 moves to the alignment pose $P_A$ and with the sensor 132 pointing at the target location 250 in the target direction $T_D$, commanding the sensor 132 to capture the sensor data 134 of the target location 250 in the environment 30.

Thus, the present system is configured to receive a sensor pointing command that commands the robot to use a sensor to capture sensor data of a target location and determine, based on an orientation of the sensor relative to the target location, a target direction for pointing the sensor toward the target location, and/or an alignment pose for achieving the target direction. The system can command the robot to move to the alignment pose and/or capture the sensor data of the target location with the sensor pointing in the target direction. The systems and methods described herein thus allow for accurate and repeatable sensor data capture based on orientation of the sensor relative to the target location. Furthermore, some implementations further enhance accuracy and/or repeatability by using feedback from the sensor itself, image data captured by a second sensor at the robot, and/or object detection capabilities based on object classification and/or based on a provided model of an object.

Figure 8:
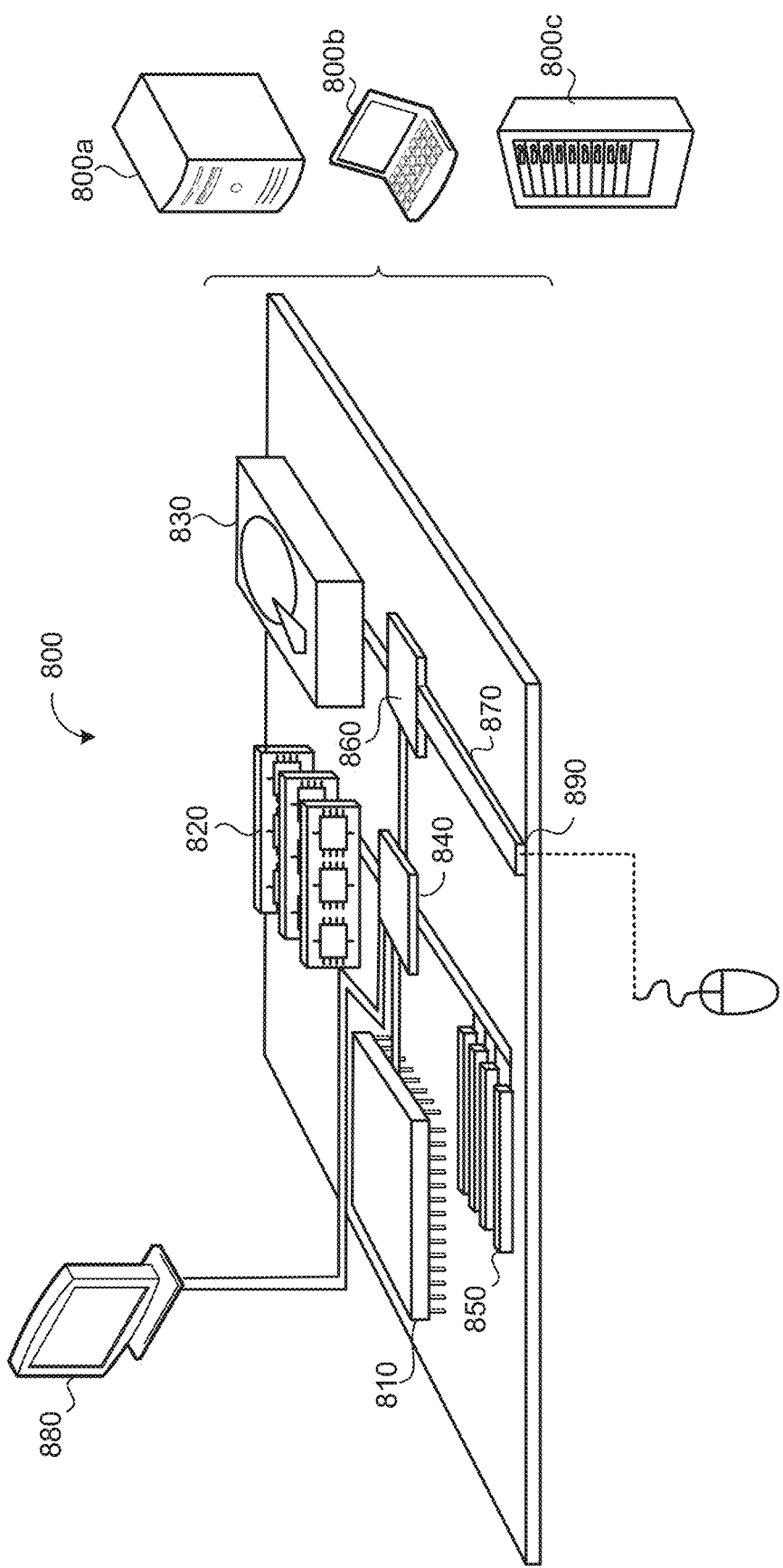
FIG. 8 is a schematic view of an example computing device that may be used to implement the systems and methods described herein.

FIG. 8 is schematic view of an example computing device 800 that may be used to implement the systems and methods described in this document. The computing device 800 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 800 includes a processor 810, memory 820, a storage device 830, a high-speed interface/controller 840 connecting to the memory 820 and high-speed expansion ports 850, and a low speed interface/controller 860 connecting to a low speed bus 870 and a storage device 830. Each of the components 810, 820, 830, 840, 850, and 860, are interconnected using various busses, and may be mounted on a common motherboard or in other manners as appropriate. The processor 810 can process instructions for execution within the computing device 800, including instructions stored in the memory 820 or on the storage device 830 to display graphical information for a graphical user interface (GUI) on an external input/output device, such as display 880 coupled to high speed interface 840. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 820 stores information non-transitorily within the computing device 800. The memory 820 may be a computer-readable medium, a volatile memory unit(s), or non-volatile memory unit(s). The non-transitory memory 820 may be physical devices used to store programs (e.g., sequences of instructions) or data (e.g., program state information) on a temporary or permanent basis for use by the computing device 800. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 830 is capable of providing mass storage for the computing device 800. In some implementations, the storage device 830 is a computer-readable medium. In various different implementations, the storage device 830 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 820, the storage device 830, or memory on processor 810.

The high speed controller 840 manages bandwidth-intensive operations for the computing device 800, while the low speed controller 860 manages lower bandwidth-intensive operations. Such allocation of duties is exemplary only. In some implementations, the high-speed controller 840 is coupled to the memory 820, the display 880 (e.g., through a graphics processor or accelerator), and to the high-speed expansion ports 850, which may accept various expansion cards (not shown). In some implementations, the low-speed controller 860 is coupled to the storage device 830 and a low-speed expansion port 890. The low-speed expansion port 890, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 800a or multiple times in a group of such servers 800a, as a laptop computer 800b, or as part of a rack server system 800c.

Figure 9:
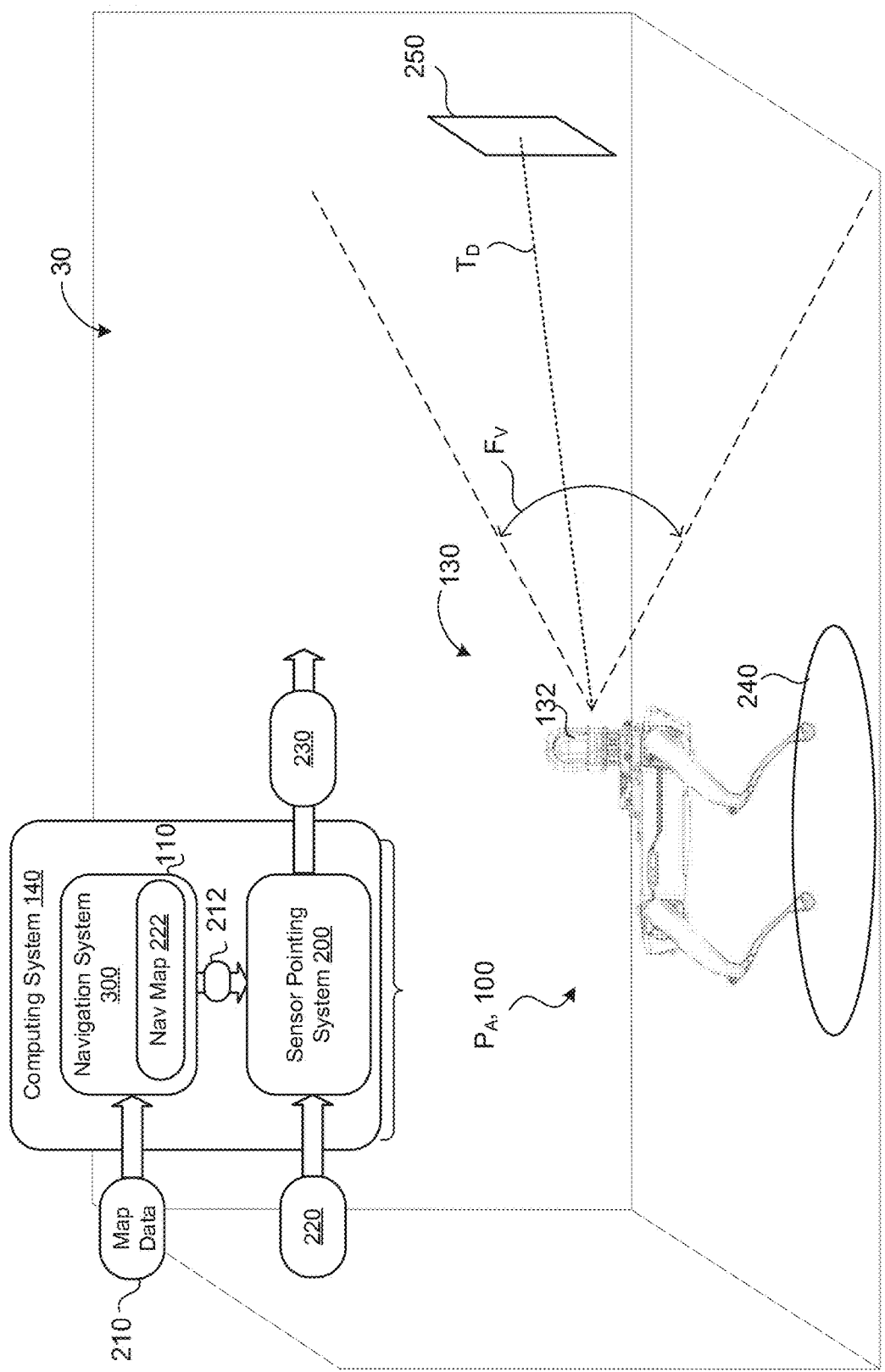
FIG. 9 is a schematic view of a robot with a sensor pointing system according to another embodiment.

FIG. 9 is a schematic view of a robot 100 with a sensor pointing system 130 according to another embodiment. The embodiment of FIG. 9 is similar to the embodiment of FIG. 2, except the robot 100 includes a specific configuration of a PTZ senor 132 shown in FIG. 9.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user. In certain implementations, interaction is facilitated by a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times. Furthermore, the elements and acts of the various embodiments described above can be combined to provide further embodiments. Indeed, the methods and systems described herein may be embodied in a variety of other forms; furthermore, various omissions, substitutions and changes in the form of the methods and systems described herein may be made without departing from the spirit of the disclosure. Accordingly, other implementations are within the scope of the following claims.

What is claimed is:

1. A computer-implemented method that when executed by data processing hardware of a legged robot causes the data processing hardware to perform operations comprising:
receiving, from a user computing device, a sensor pointing command that commands the legged robot to navigate to a waypoint and use a first sensor of the legged robot to capture sensor data of a target location in an environment of the legged robot by pointing the first sensor in a target direction toward the target location at the waypoint;
commanding a first movement of one or more legs of the legged robot to move the legged robot to the waypoint based on receiving the sensor pointing command, wherein the first movement of the one or more legs transitions the legged robot from a first pose of the legged robot to a second pose of the legged robot using a set of joints of the legged robot;
determining a first orientation of the first sensor relative to the target location based on the second pose of the legged robot;
obtaining, from a second sensor that is different than the first sensor, first image data;
determining, based on the sensor pointing command, the first image data obtained from the second sensor, and the first orientation of the first sensor relative to the target location, a third pose of the legged robot that points the first sensor in the target direction toward the target location, wherein each of the first pose, the second pose, and the third pose correspond to a respective set of positions of the set of joints;
commanding a second movement of the one or more legs based on receiving the sensor pointing command, wherein the second movement of the one or more legs transitions the legged robot from the second pose to the third pose using the set of joints; and
commanding the first sensor to capture the sensor data of the target location based on receiving the sensor pointing command.

2. The method of claim 1, wherein the sensor pointing command comprises one or more sensor data capture parameters, the one or more sensor data capture parameters comprising an angle of the first sensor, a height of the first sensor, a proximity of the first sensor relative to the target location, or a direction of the first sensor relative to the target location.

3. The method of claim 1, wherein the first sensor comprises a camera, wherein the sensor data of the target location comprises second image data of the target location, wherein the sensor pointing command comprises an identifier of an object, and wherein the operations further comprise:
detecting, using the second image data of the target location, the object within the environment based on the sensor pointing command.

4. The method of claim 1, wherein the first sensor comprises a pan-tilt-zoom (PTZ) sensor.

5. The method of claim 4, wherein the operations further comprise:
determining, based on the sensor pointing command and the first orientation of the first sensor relative to the target location, a second orientation of the first sensor relative to the target location for aligning a field of view of the PTZ sensor with the target direction; and
commanding a third movement of the PTZ sensor based on determining the second orientation of the first sensor relative to the target location, wherein a combination of the third movement of the PTZ sensor and the second movement of the one or more legs causes the first sensor to point in the target direction toward the target location.

6. The method of claim 5, wherein the operations further comprise:
receiving, from the PTZ sensor, feedback data indicating an error associated with the field of view of the PTZ sensor, wherein determining the third pose is further based on the feedback data.

7. The method of claim 6, wherein the error indicates that a difference between the field of view of the PTZ sensor and a field of view associated with pointing in the target direction toward the target location is greater than or equal to a threshold difference.

8. The method of claim 1, wherein receiving the sensor pointing command comprises receiving a user input indicating a selection of a ray or a point relative to a coordinate frame of the legged robot.

9. The method of claim 1, wherein the sensor pointing command comprises a model of an object, and wherein the operations further comprise:
  obtaining second image data;
  identifying, using the model of the object, the object within the second image data; and
  determining the target direction based on identifying the object.

10. The method of claim 1, wherein the sensor pointing command comprises an output of an object detector, and wherein the operations further comprise:
  obtaining second image data;
  identifying, using the output of the object detector, an object within the second image data; and
  determining the target direction based on the object and a field of view of the first sensor.

11. The method of claim 1, wherein the first sensor is fixed to the legged robot.

12. The method of claim 1, wherein the operations further comprise:
  determining inverse kinematics associated with the legged robot, wherein determining the third pose is further based on determining the inverse kinematics associated with the legged robot.

13. The method of claim 1, wherein the operations further comprise:
  coordinating a movement of the first sensor and the second movement of the one or more legs to align the first sensor with the target direction.

14. The method of claim 1, wherein the first orientation of the first sensor relative to the target location is updated based on the second movement of the one or more legs, and wherein commanding the first sensor to capture the sensor data is further based on the first orientation of the first sensor relative to the target location.

15. A system comprising:
  data processing hardware; and
  memory hardware in communication with the data processing hardware, the memory hardware storing instructions that when executed by the data processing hardware cause the data processing hardware to:
    receive, from a user computing device, a sensor pointing command that commands a legged robot to navigate to a waypoint and use a first sensor disposed on the legged robot to capture sensor data of a target location in an environment of the legged robot by pointing the first sensor in a target direction toward the target location at the waypoint;
    command a first movement of one or more legs of the legged robot to move the legged robot to the waypoint based on receiving the sensor pointing command, wherein the first movement of the one or more legs transitions the legged robot from a first pose of the legged robot to a second pose of the legged robot using a set of joints of the legged robot;
    determine a first orientation of the first sensor relative to the target location based on the second pose of the legged robot;
    obtain, from a second sensor that is different than the first sensor, first image data;
    determine, based on the sensor pointing command, the first image data obtained from the second sensor, and the first orientation of the first sensor relative to the target location, a third pose of the legged robot that points the first sensor in the target direction toward the target location, wherein each of the first pose, the second pose, and the third pose correspond to a respective set of positions of the set of joints;
    command a second movement of the one or more legs based on receiving the sensor pointing command, wherein the second movement of the one or more legs transitions the legged robot from the second pose to the third pose using the set of joints; and
    command the first sensor to capture the sensor data of the target location based on receiving the sensor pointing command.

16. The system of claim 15, wherein the sensor pointing command comprises one or more sensor data capture parameters, the one or more sensor data capture parameters comprising an angle of the first sensor, a height of the first sensor, a proximity of the first sensor relative to the target location, or a direction of the first sensor relative to the target location.

17. The system of claim 15, wherein the first sensor comprises a camera, wherein the sensor data of the target location comprises second image data of the target location, wherein the sensor pointing command comprises an identifier of an object, and wherein execution of the instructions by the data processing hardware further causes the data processing hardware to:
  detect, using the second image data of the target location, the object within the environment based on the sensor pointing command.

18. The system of claim 15, wherein the first sensor comprises a pan-tilt-zoom (PTZ) sensor.

19. The system of claim 18, wherein execution of the instructions by the data processing hardware further causes the data processing hardware to:
  determine, based on the sensor pointing command and the first orientation of the first sensor relative to the target location, a second orientation of the first sensor relative to the target location for aligning a field of view of the PTZ sensor with the target direction; and
  command a third movement of the PTZ sensor based on determining the second orientation of the first sensor relative to the target location, wherein a combination of the third movement of the PTZ sensor and the second movement of the one or more legs causes the first sensor to point in the target direction toward the target location.

20. The system of claim 19, wherein the execution of the instructions by the data processing hardware further causes the data processing hardware to:
  receive, from the PTZ sensor, feedback data indicating an error associated with the field of view of the PTZ sensor, wherein determining the third pose is further based on the feedback data.

21. The system of claim 20, wherein the error indicates that a difference between the field of view of the PTZ sensor and a field of view associated with pointing in the target direction toward the target location is greater than or equal to a threshold difference.

22. The system of claim 15, wherein to receive the sensor pointing command, execution of the instructions by the data processing hardware further causes the data processing hardware to:
receive a user input indicating a selection of a ray or a point relative to a known coordinate frame of the legged robot.

23. The system of claim 15, wherein the sensor pointing command comprises a model of an object, and wherein execution of the instructions by the data processing hardware further causes the data processing hardware to:
obtain second image data;
identify, using the model of the object, the object within the second image data; and
determine the target direction based on identifying the object.

24. The system of claim 15, wherein the sensor pointing command comprises an output of an object detector, and wherein execution of the instructions by the data processing hardware further causes the data processing hardware to:
obtain second image data;
identify, using the output of the object detector, an object within the second image data; and
determine the target direction based on the object and a field of view of the first sensor.

25. The system of claim 15, wherein the first sensor is fixed to the legged robot.

26. The system of claim 15, wherein execution of the instructions by the data processing hardware further causes the data processing hardware to:
determine inverse kinematics associated with the legged robot, wherein determining the third pose is further based on determining the inverse kinematics associated with the legged robot.

27. The system of claim 15, wherein the first orientation of the first sensor relative to the target location is updated based on the second movement of the one or more legs, and wherein commanding the first sensor to capture the sensor data is further based on the first orientation of the first sensor relative to the target location.

* * * * *